United States Patent
Kim et al.

(10) Patent No.: US 6,891,947 B1
(45) Date of Patent: May 10, 2005

(54) MULTIFUNCTIONAL ANALOG TRUNK CIRCUIT

(75) Inventors: Kyung-Hwan Kim, Suwon-shi (KR); Dong-Sik Han, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/471,820

(22) Filed: Dec. 23, 1999

(30) Foreign Application Priority Data

Dec. 23, 1998 (KR) .......................................... 98-57589

(51) Int. Cl.[7] ................................................ H04M 3/00
(52) U.S. Cl. ................................... 379/333; 379/334
(58) Field of Search .............................. 379/333, 334, 379/219, 220.01; 374/242; 370/351

(56) References Cited

U.S. PATENT DOCUMENTS 4,756,018 A * 7/1988 Fujiwara .................... 455/560

* cited by examiner

*Primary Examiner*—Forester W. Isen
*Assistant Examiner*—Jefferey Harold
(74) *Attorney, Agent, or Firm*—Cha & Reiter, L.L.C.

(57) ABSTRACT

A multifunctional analog TRK circuit board is designed so as to serve as both loop, ground start, DID, E&M, ring down and both way TRK. Thus, the various analog TRK circuits are embodied in a single TRK board, thereby increasing productivity compared to the conventional system requiring separate TRK circuit boards. The multifunctional TRK circuit is selectively controlled to provide desired TRK functions.

8 Claims, 17 Drawing Sheets

MULTIFUNCTIONAL ANALOG TRUNK CIRCUIT

CLAIM OF PRIORITY

This application makes reference to, incorporates the same herein, and claims all benefits accruing under 35 U.S.C. Section 119 from an application for "Multifunctional Analog Trunk Circuit" filed earlier in the Korean Industrial Property Office on Dec. 23, 1998 and there duly assigned Serial No. 98-57859.

BACKGROUND OF THE INVENTION

1. Field of the Invention

The present invention relates to an analog trunk circuit used in a telephone switching system, and more particularly a programmable analog trunk circuit which may serve up multifunction under software control.

2. Description of the Related Art

Generally, the trunk circuit (TRK) interfaces the switching system with the central office line so as to form a communication loop by seizing the central office line. TRK circuits may be usually divided into two groups, namely, analog and digital type according to the method of transmitting signals. In addition, the analog TRK circuits may be further divided into loop TRK, ground start TRK, DID (Direct Inward Dialing tie line) TRK, E&M (Ear & Mouth tie line) TRK, ring down tie line TRK, and both way tie line TRK circuits according to their functions.

Most of the switching systems are in the form of a cabinet having a plurality of shelves to respectively mount a control board, switching board, subscriber board, trunk board, etc. As for the TRK board, it is preferably designed to accommodate various daughter boards, each serving as a particular TRK circuit. For example, the conventional analog TRK board, as shown in FIG. 1, includes a plurality of communication ports to respectively connect with loop TRK circuit, ground start TRK circuit, DID TRK circuit, E&M TRK circuit, ring down TRK circuit and both way TRK circuit board.

As described above, such conventional switching system requires a plurality of daughter boards having respective functions to meet various trunk circuits, thus increasing the cost of maintaining the system. Moreover, in order to replace a daughter board with another for accommodating a new operational environment, the corresponding shelf should first be removed from the cabinet, thereby causing much inconvenience.

SUMMARY OF THE INVENTION

It is an object of the present invention to provide a switching system having a multifunctional analog TRK circuit which provides various kinds of TRK circuits.

Another object of the present invention is to provide a switching system with a multifunctional analog TRK circuit which may be achieved by considerably low cost.

Yet, another object of the present invention to provide a switching system with a multifunctional analog TRK circuit which eliminates such inconvenience as to replace a TRK circuit previously mounted with another.

According to the present invention, a multifunctional analog TRK circuit board is designed so as to serve as both loop, ground start, DID, E&M, ring down, and both way TRK circuits. Thus, the various analog TRK circuits are embodied in a single TRK board, thereby increasing productivity compared to the conventional system requiring separate TRK circuit boards. The multifunctional TRK circuit is selectively controlled to provide desired TRK functions.

According to one aspect of the present invention, a multifunctional analog TRK circuit, which has a tip terminal, "M" terminal and "E" terminal connected with a central office line, and is connected through a transformer, hybrid circuit and codec to a switching circuit, comprises a first and a second relay respectively connected with the tip terminal and ring terminal to control the polarity reverse in DID trunk mode; a third relay connected between the output of the first relay and the upper end of the primary coil of the transformer to occupy the loop in loop or ground start TRK mode; a ring path connected in parallel with both ends of the third relay to transfer a ring signal coming from the central office line; a fourth relay driven in the ground start TRK mode to be cut off when the third relay occupies the loop; a tip ground detection circuit connected with the output of the fourth relay to detect grounding of the tip terminal in the ground start TRK mode; a fifth relay connected with the output of the second relay to be driven in the ground start TRK mode; a ring ground enable circuit connected with the output of the fifth relay to ground the ring terminal in the ground start TRK mode; a bridge diode connected in parallel with the transformer to full-wave rectify a signal transferred through the ring path; a sixth and a seventh relay respectively connected between the ring path and the bridge diode, and between the bridge diode and the output of the second relay to provide dial pulses in the loop or ground start TRK mode; a bypass circuit connected with the output of the bridge diode to bypass a direct current voltage output of the bridge diode in the loop or ground start TRK mode; a ring & HOS detection circuit connected with the bypass circuit to detect the ring and HOS signal in the loop or ground start TRK mode, and the HOS signal in the DID TRK mode; a feeding circuit connected with the "M" terminal to supply a prescribed source voltage to the sixth and seventh relays; an eighth relay connected with the "M" terminal to ground the "M" terminal when idle and to supply the source voltage to the "M" terminal in the E&M TRK mode; and an HOS signal detection circuit connected with the "E" terminal to detect the HOS signal in the E&M TRK mode. Preferably, the first and second relays are paired, the third and fourth relays are paired, the fifth and eighth relays are paired, and the sixth and seventh relays are paired, so that the relays of each pair are simultaneously operated.

According to another aspect of the present invention, a multifunctional analog TRK circuit, which has a tip terminal, "M" terminal and "E" terminal connected with a central office line, and is connected through a transformer, hybrid circuit and codec to a switching circuit, comprises a first and a second relay respectively connected with the tip terminal and ring terminal to control a ring signal in ring down TRK mode; a third relay connected between the output of the first relay and the upper end of the primary coil of the transformer to occupy the loop in the loop or ring down TRK mode; a ring path connected in parallel with both ends of the third relay to transfer a ring signal coming from the central office line; a bridge diode connected in parallel with the transformer to full-wave rectify a signal transferred through the ring path; a fourth and a fifth relay respectively connected between the ring path and the bridge diode, and between the bridge diode and the output of the second relay to provide dial pulses in the loop, ring down or both way TRK mode; a bypass circuit connected with the output of the bridge diode to bypass a direct current voltage output of the bridge diode in the loop or both way TRK mode; a ring & HOS detection circuit connected with the bypass circuit to detect the ring and the HOS signal in the loop or ring down TRK mode, and the HOS signal in the both way TRK mode; a feeding circuit for supplying a prescribed source voltage to the fourth and fifth relays in the both way TRK mode; a sixth relay connected with the "M" terminal to supply the source voltage to the "M" terminal when idle and to ground the "M" terminal in E&M TRK mode; and a HOS signal detection circuit connected with the "E" terminal to detect the HOS signal in the E&M TRK mode. Preferably, the first and second relays are paired, and the fourth and fifth relays are paired, so that the relays of each pair are simultaneously operated.

The present invention will now be described more specifically with reference to the drawings attached only by example.

A BRIEF DESCRIPTION OF THE DRAWINGS

Figure 1:
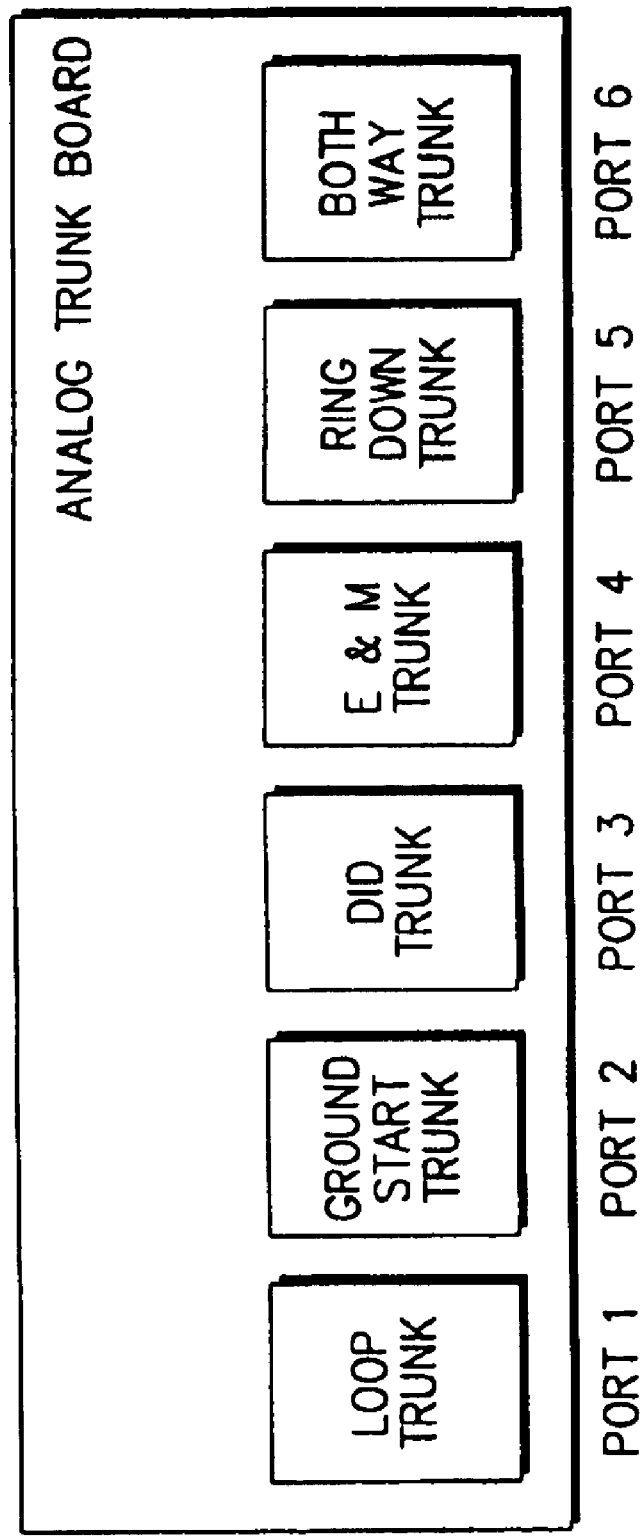
FIG. 1 is a block diagram for illustrating the structure of a conventional analog TRK circuit board.
Figure 2:
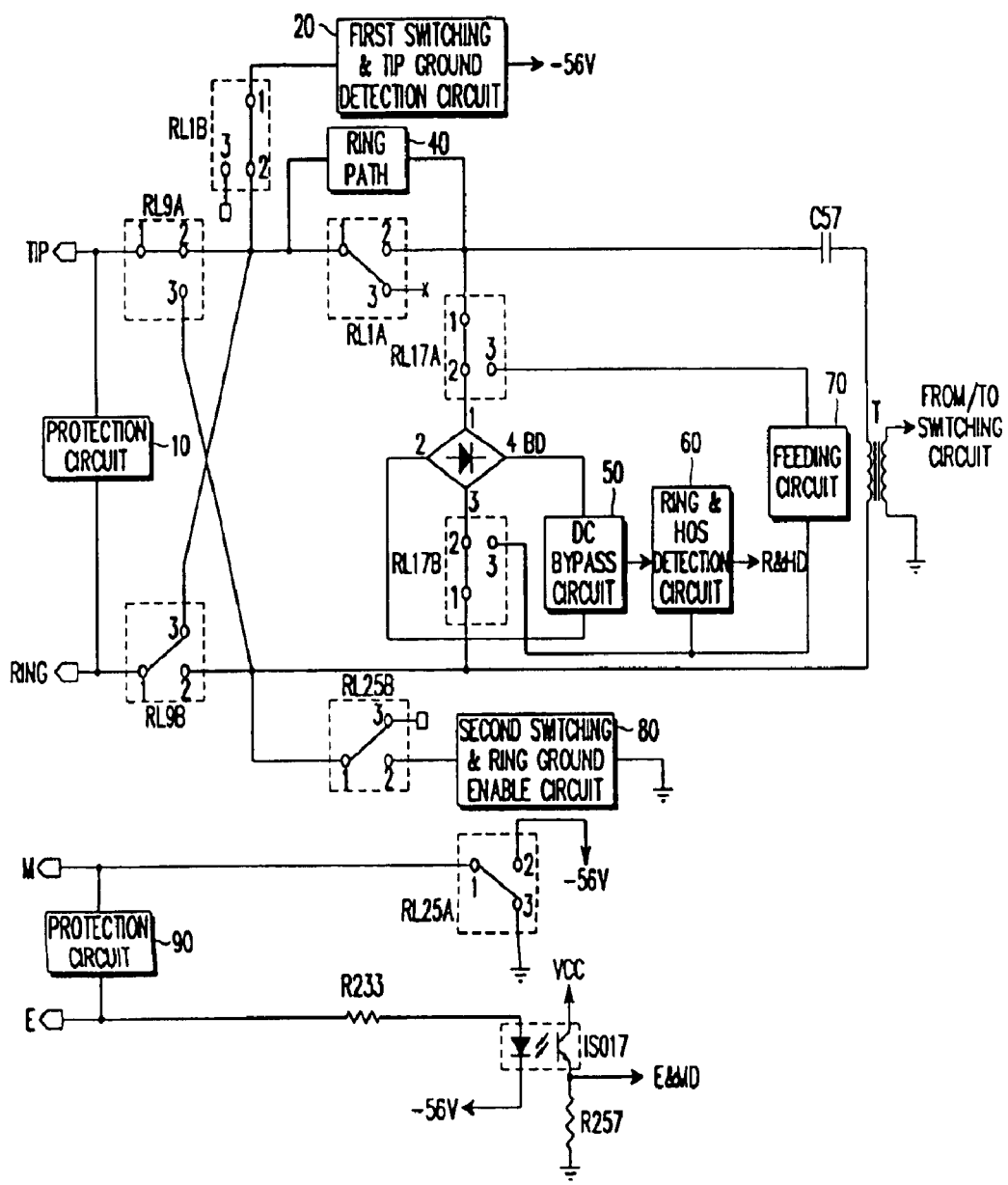
FIG. 2 is a schematic diagram for illustrating a multifunctional analog TRK circuit according to an embodiment of the present invention.
Figure 3:
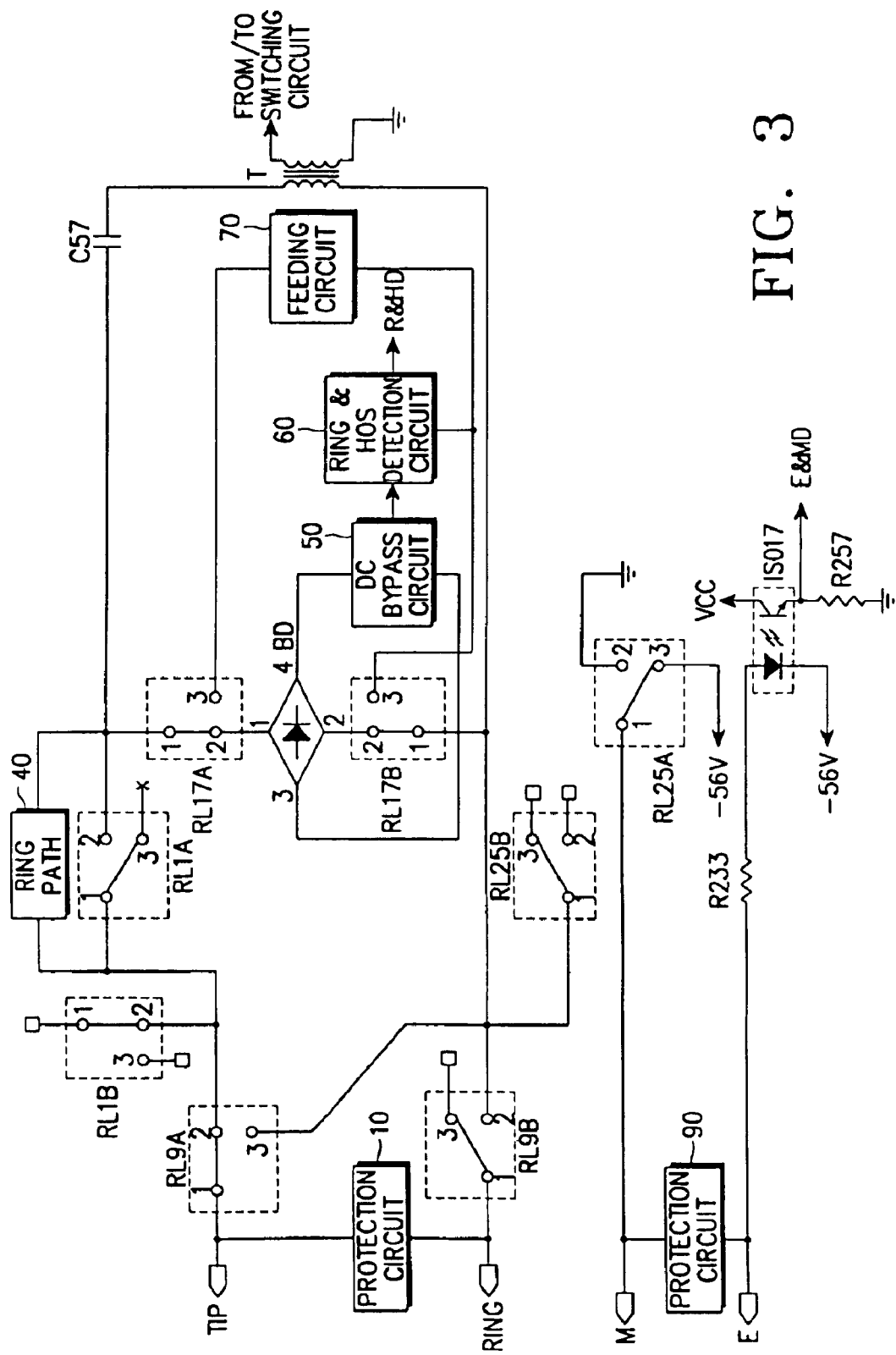
FIG. 3 is a schematic diagram for illustrating a multifunctional analog TRK circuit according to another embodiment of the present invention.
Figure 4:
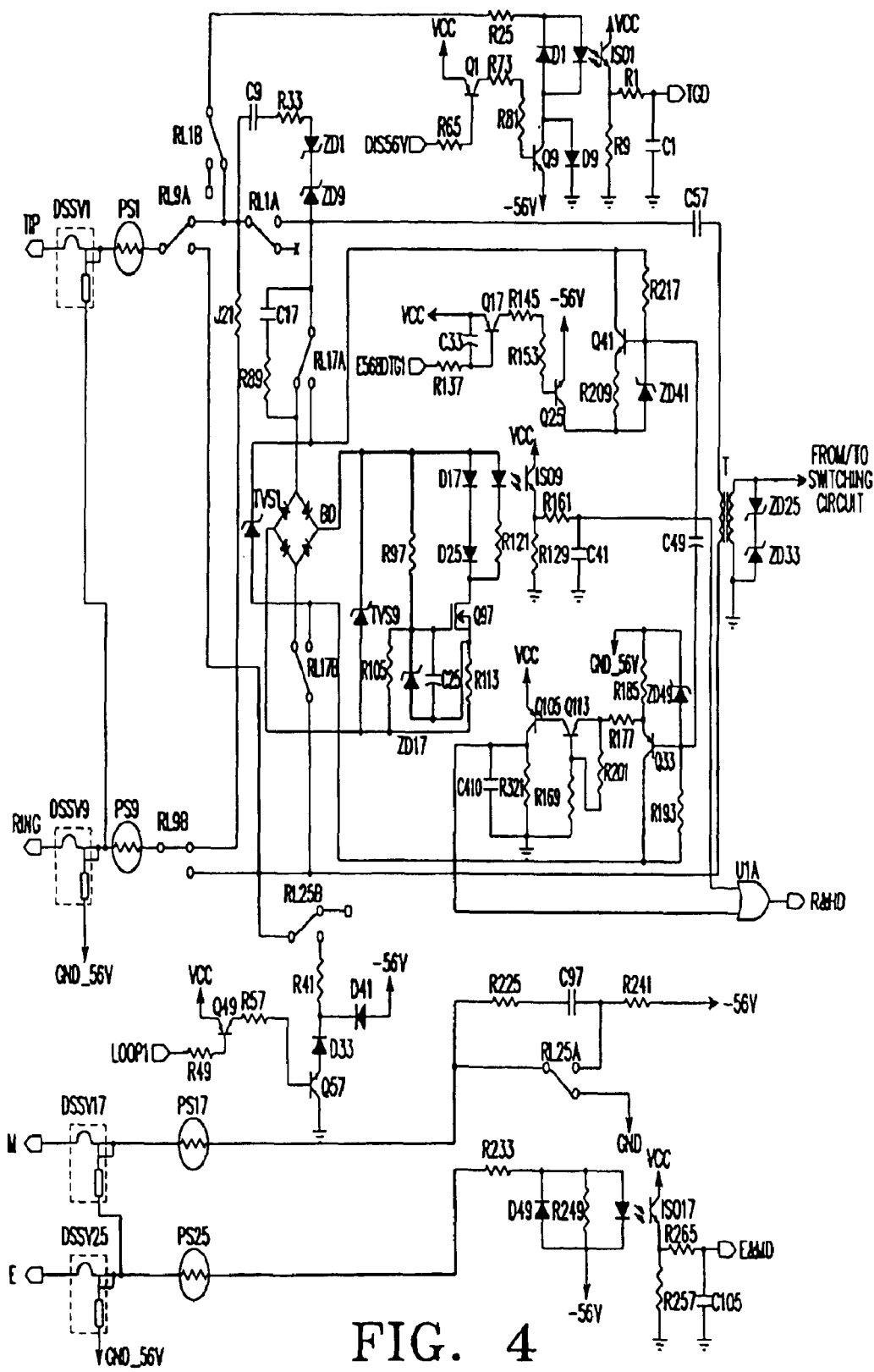
Figure 5:
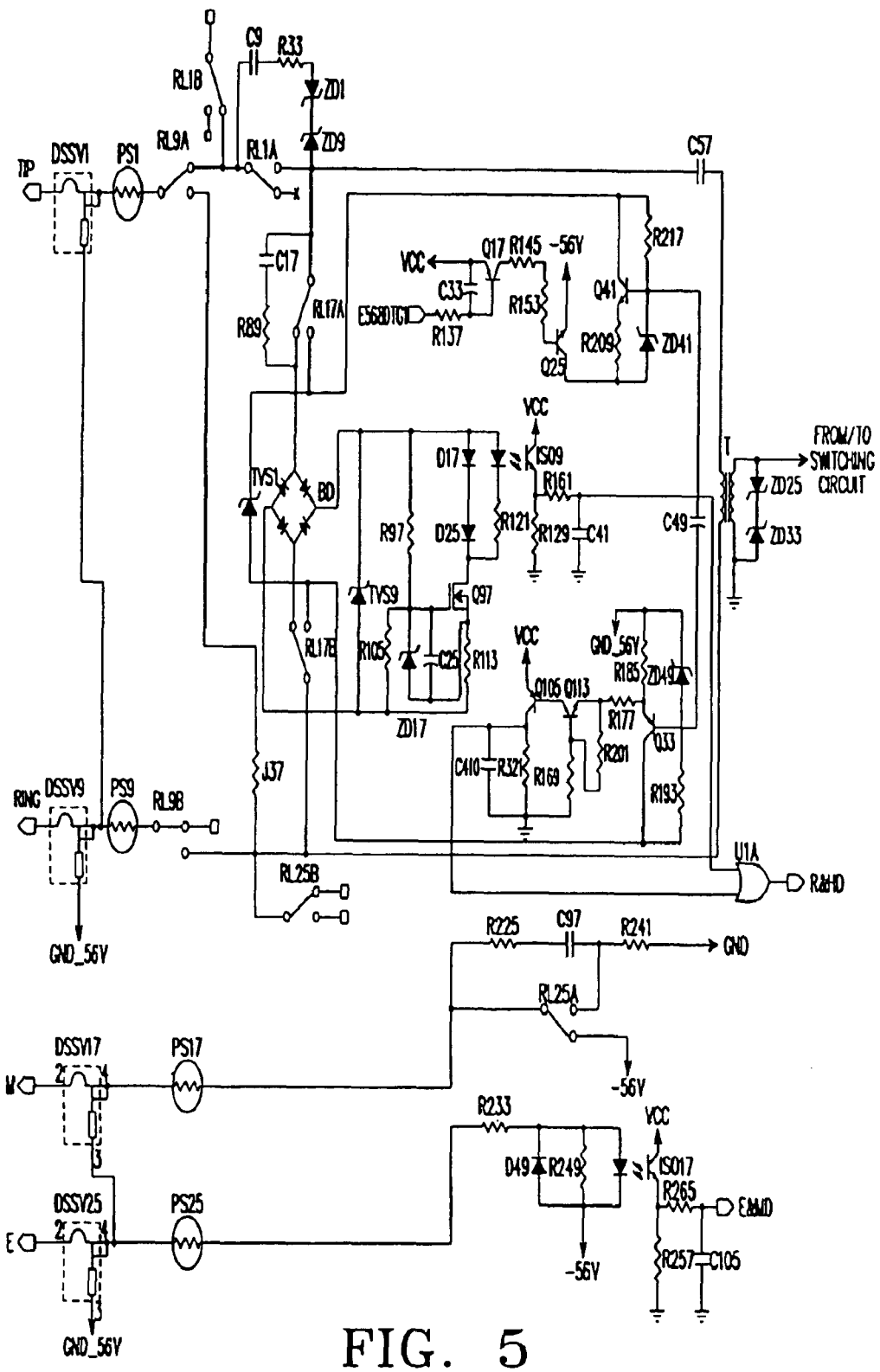
Figure 6:
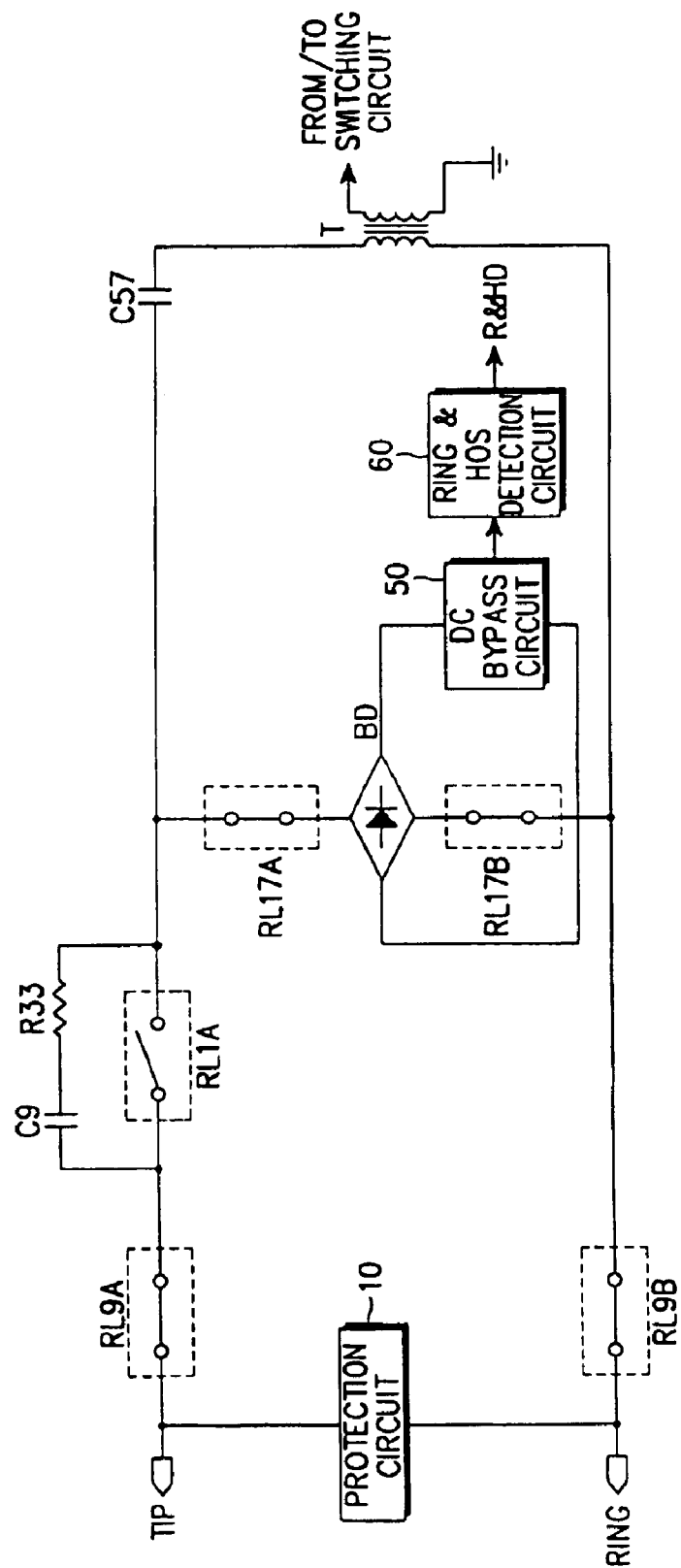
Figure 7:
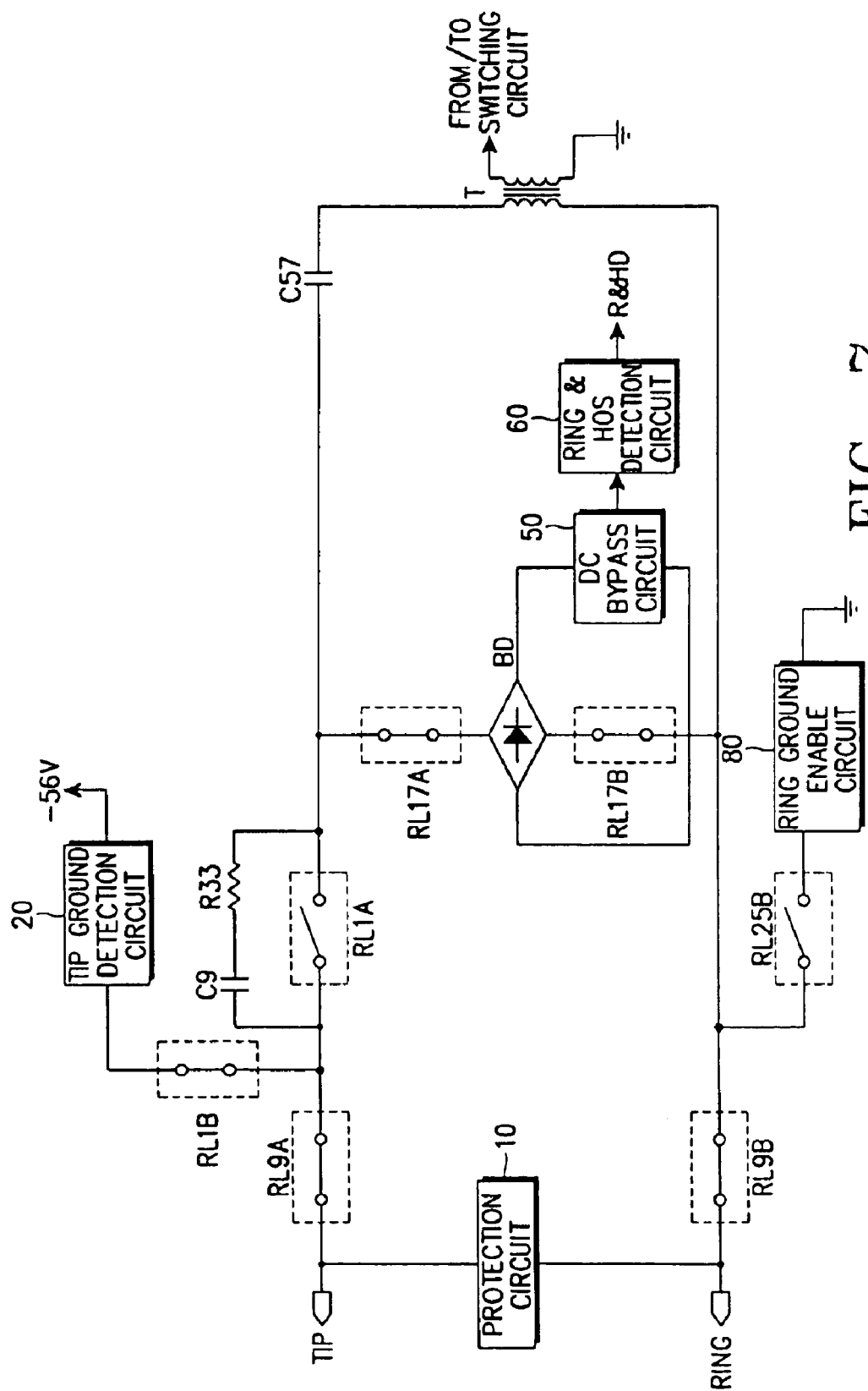
Figure 8:
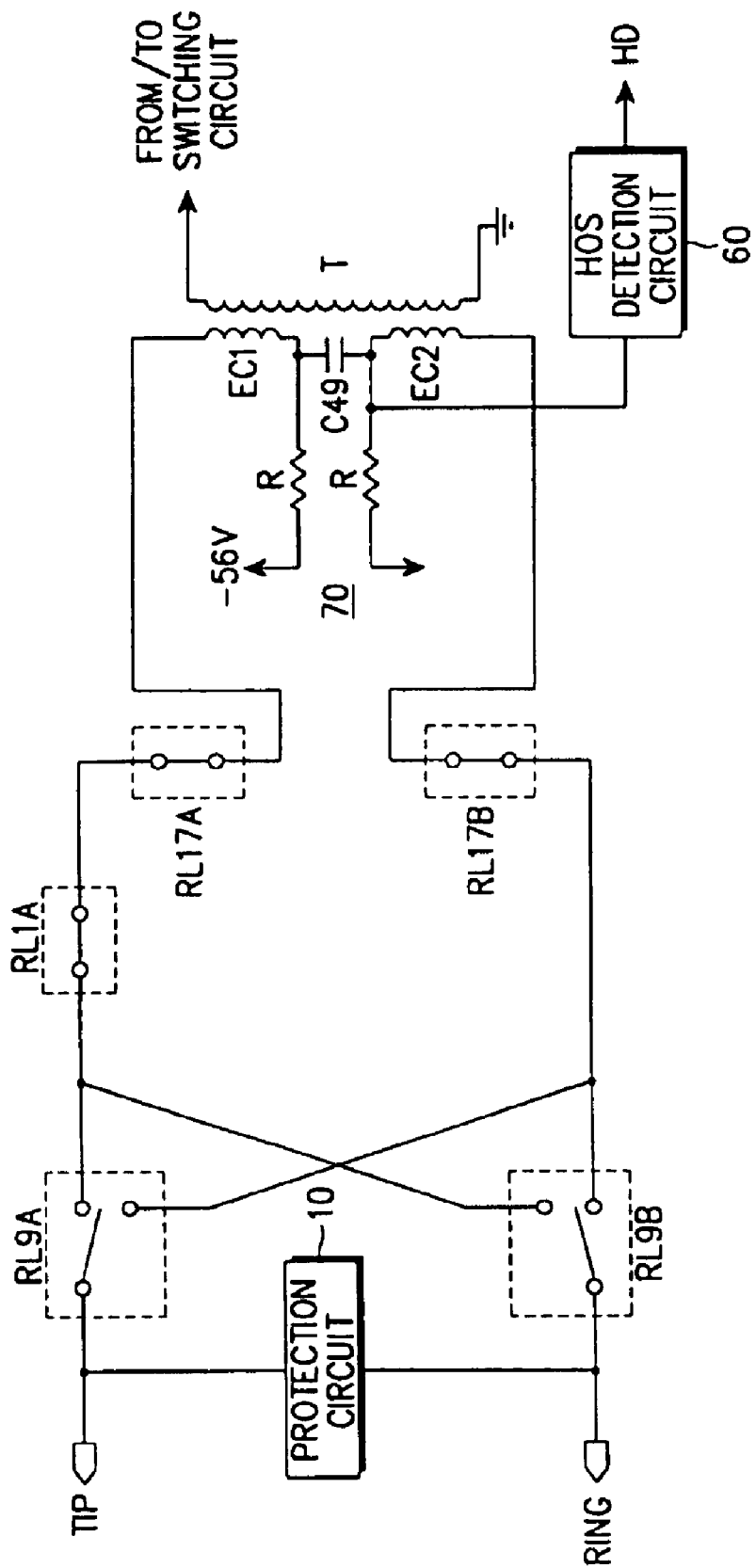
Figure 9:
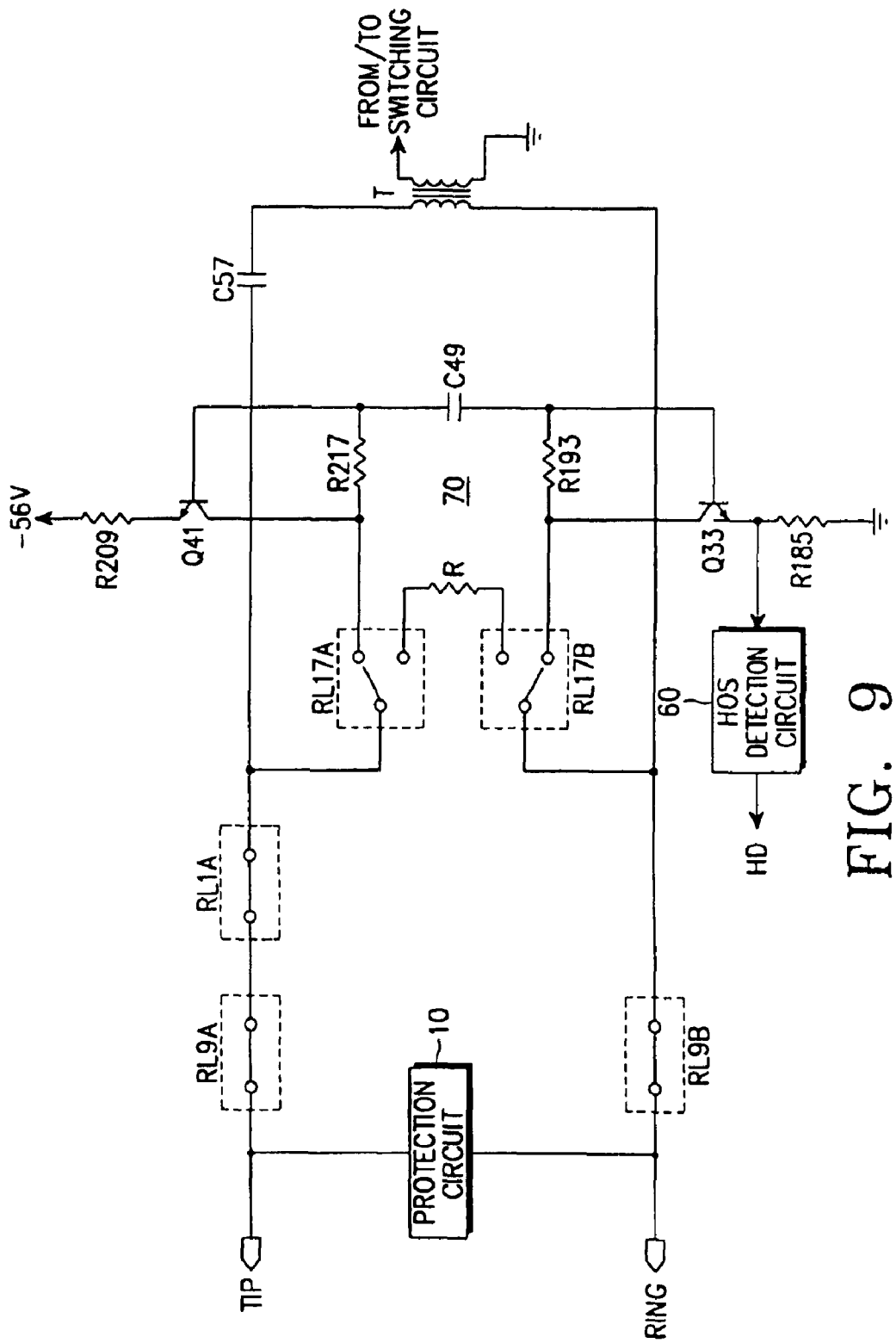
Figure 10:
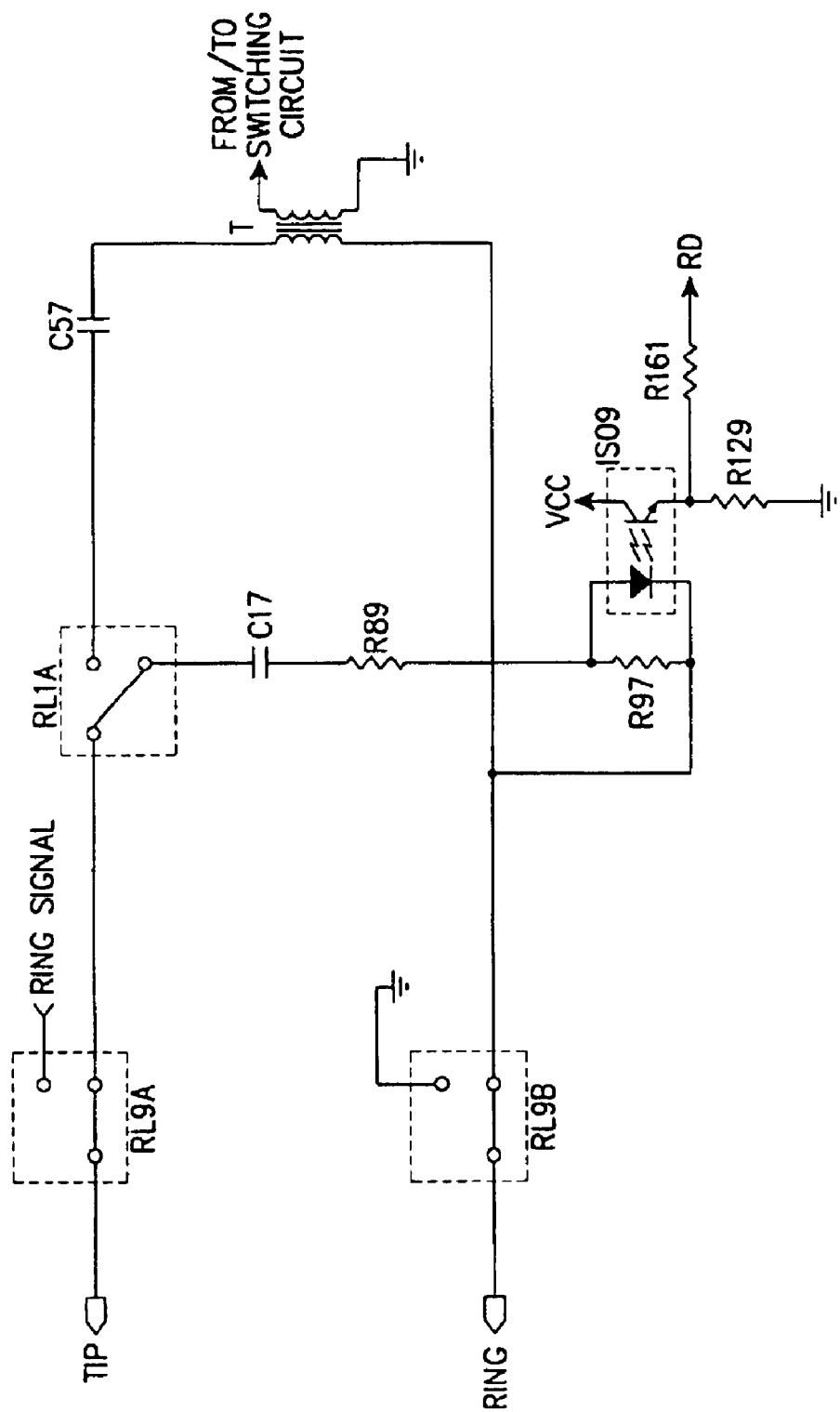
Figure 11:
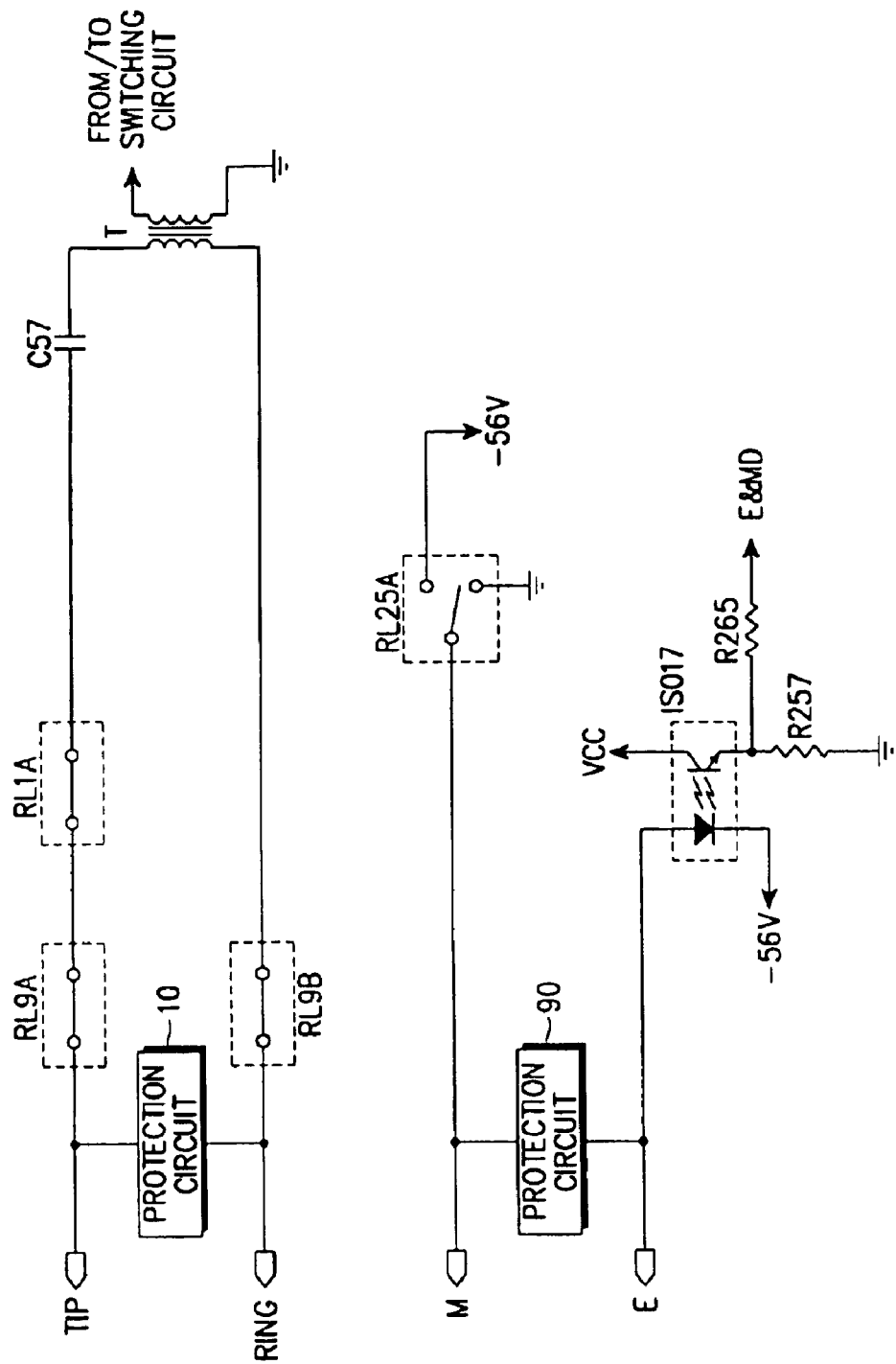
Figure 13:
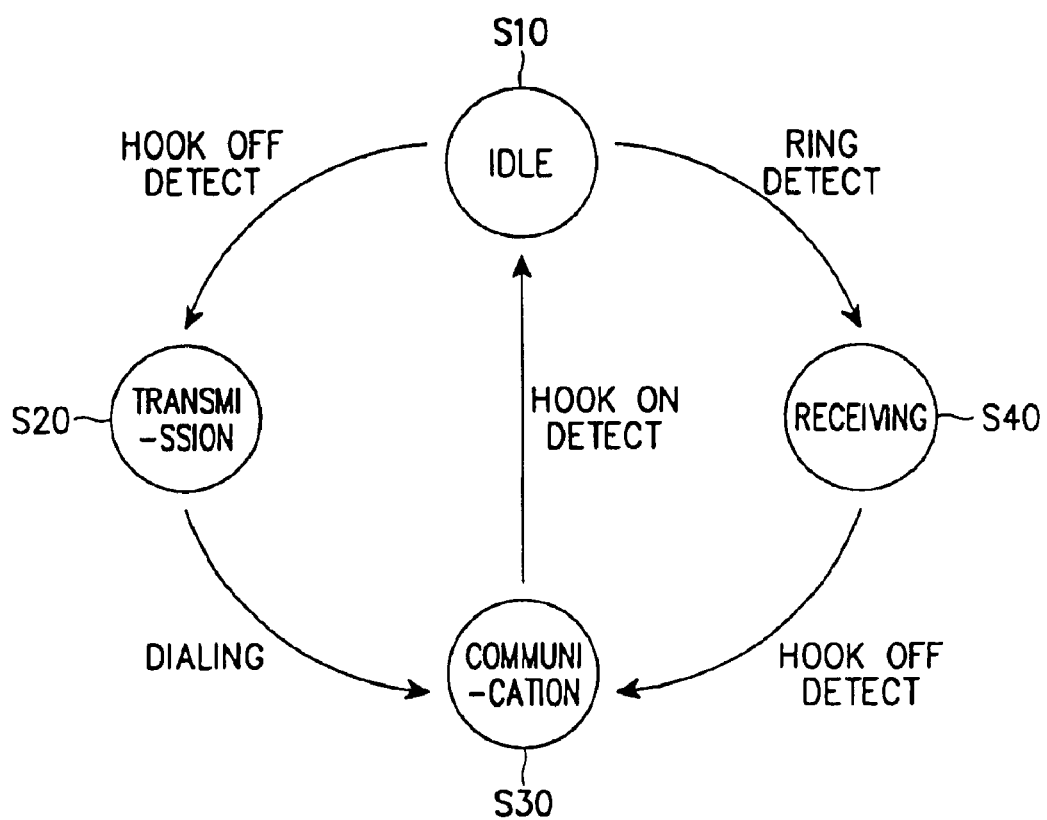
Figure 14:
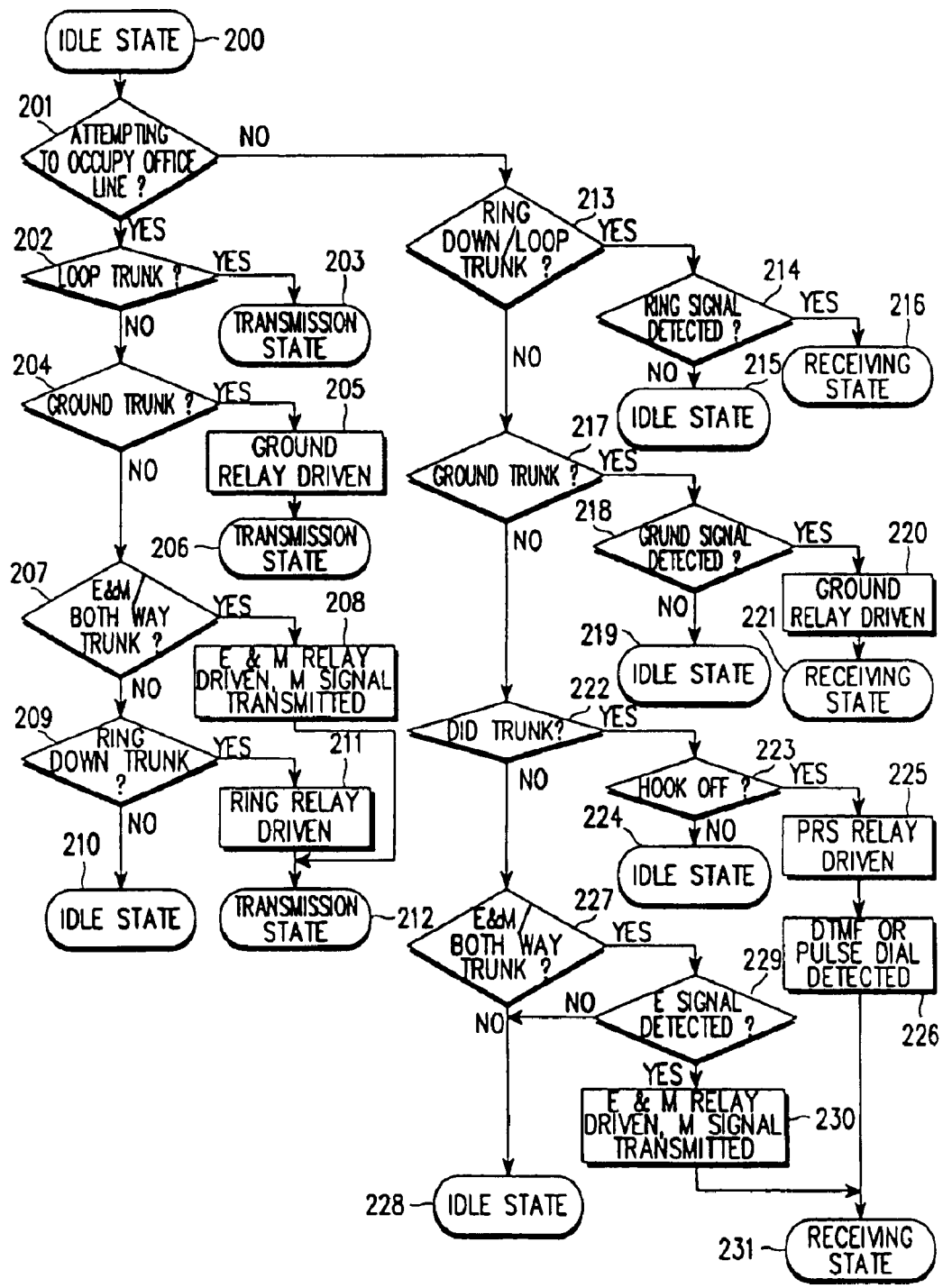
Figure 15:
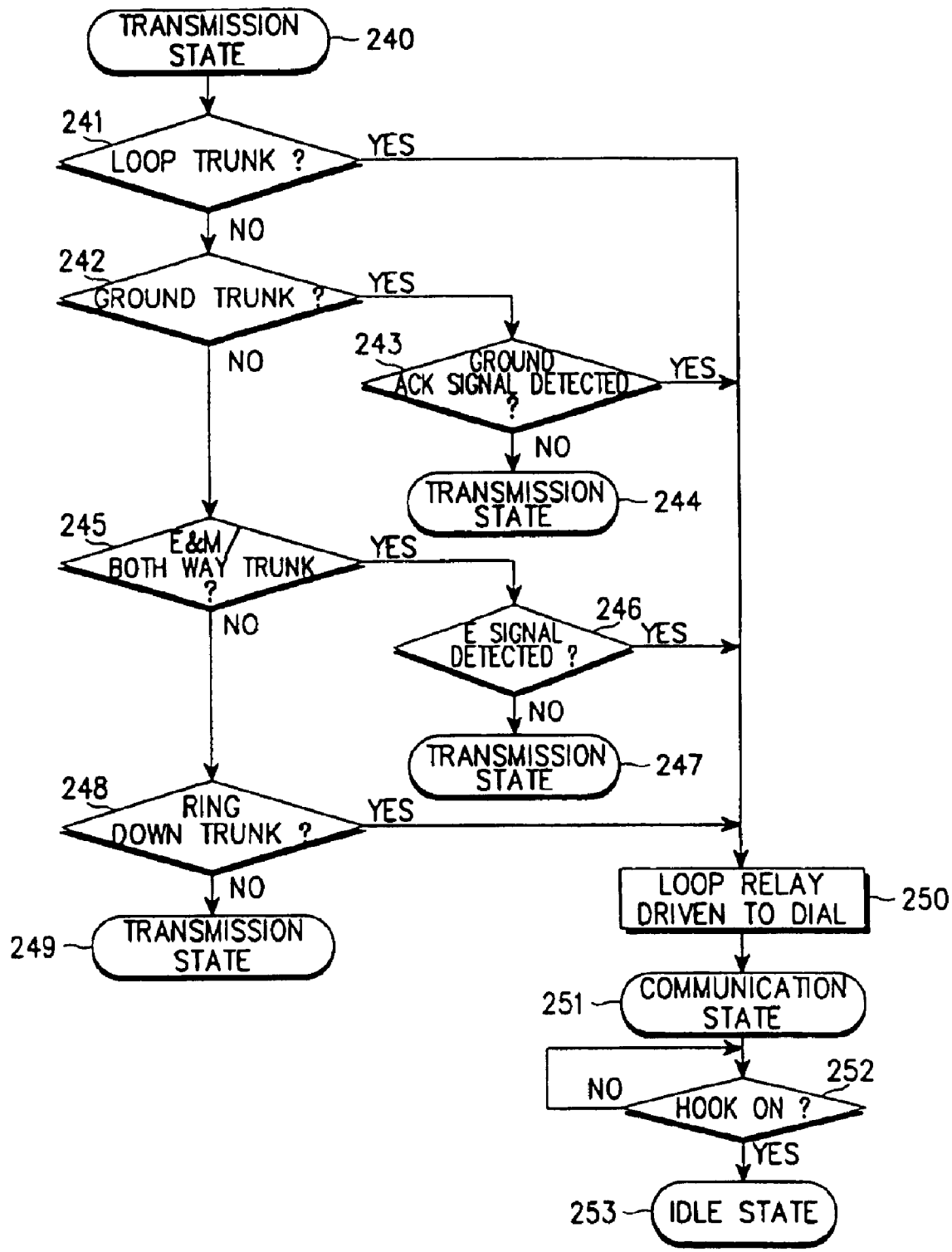
Figure 16:
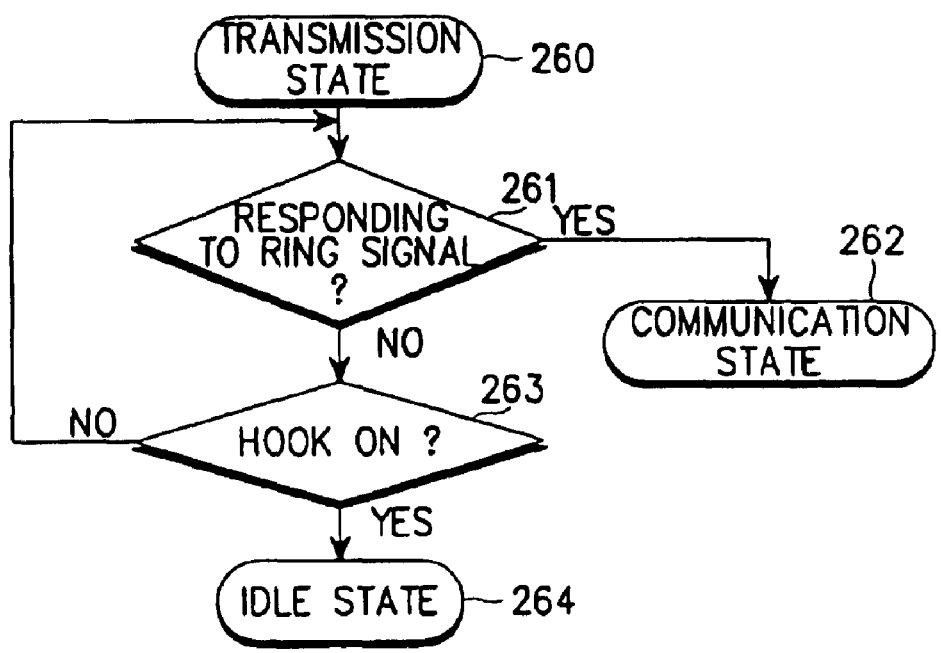

FIG. 4 details the multifunctional analog TRK circuit as shown in FIG. 2;

FIG. 5 details the multifunctional analog TRK circuit as shown in FIG. 3;

FIG. 6 is a schematic circuit diagram for illustrating the multifunctional analog TRK circuit of FIGS. 2 and 3 serving as a loop TRK circuit;

FIG. 7 is a schematic circuit diagram for illustrating the multifunctional analog TRK circuit of FIG. 2 serving as a ground start TRK circuit;

FIG. 8 is a schematic circuit diagram for illustrating the multifunctional analog TRK circuit of FIG. 2 serving as a DID TRK circuit;

FIG. 9 is a schematic circuit diagram for illustrating the multi functional analog TRK circuit of FIG. 3 serving as a both way TRK circuit;

FIG. 10 is a schematic circuit diagram for illustrating the multifunctional analog TRK circuit of FIG. 3 serving as a ring down TRK circuit;

FIG. 11 is a schematic circuit diagram for illustrating the multifunctional analog TRK circuit of FIGS. 2 and 3 serving as an E&M TRK circuit;

FIGS. 12A to 12D is a schematic diagram for illustrating a circuit to control the operation of the relays of the multifunctional analog TRK circuit of FIGS. 2 and 3;

FIG. 13 is a schematic diagram for illustrating the fundamental process of the software to operate the multifunctional analog TRK circuit according to the present invention;

FIG. 14 is a flow chart for illustrating the process of shifting the multifunctional analog circuit of the present invention from the idle state to the signal transmitting state and to the signal receiving state;

FIG. 15 is a flow chart for illustrating the process of shifting the multifunctional analog circuit of the present invention from the signal transmission state to the communication state and to the idle state; and, FIG. 16 is a flow chart for illustrating the process of shifting the multifunctional analog circuit of the present invention from the signal receiving state to the communication state and to the idle state.

A DETAILED DESCRIPTION OF THE PREFERRED EMBODIMENT

Throughout the attached drawings, the same reference numerals are used to represent the same functional elements in order to help understand of the inventive circuit. For the purpose of clarity, the detailed description of the parts commonly used to achieve conventional functions is omitted in order to not obscure the inventive concept.

As shown in FIG. 2, a first embodiment of the multifunctional TRK circuit is designed to serve as a loop, ground start, DID and E&M TRK circuit. On the other hand, the circuit according to the second embodiment is, as shown in FIG. 3, designed to serve as both loop, ring down, both way, and E&M TRK circuit. The first embodiment may be effectively applied in a country like the U.S.A. while the second embodiment may be applied in a country like Korea.

The invention is based on the fact that all of the various TRK circuits like loop, ground start, DID, ring down, both way and E&M TRK may have most of their constituent elements in common. Namely, the inventive TRK circuit is designed so that the same elements included in all of the various TRK circuits may be used in common, and the remaining different elements are selected as desired by a particular TRK circuit under the control of a software. This control is achieved by a control circuit (not shown) provided in the switching system, so that the relays and electronic switches like the transistor are operated to make the TRK circuit serve as the particular TRK. Hereinafter, among the terms used in the description, "make" means that the relay coil is supplied with a current and the "break" means the opposite. Although it is described in the following description that the feeding circuit supplies a source voltage of −56V, it may be −48V according to the kind of switching system.

EXAMPLE 1

Referring to FIG. 2, the TRK circuit of the first embodiment comprises protective circuits 10 and 90, first switching & tip ground detection circuit 20, ring path 40, bridge diode BD, DC voltage bypass circuit 50, ring & HOS detection circuit 60, feeding circuit 70, transformer T, second switching & ring ground enable circuit 80, photo coupler ISO17, resistors R233 and R257, and a plurality of relays RL1A, RL1B, RL9A, RL9B, RL17A, RL17B, RL25A, RL25B. Among these, the protective circuit 90, relay RL25A, resistors R233 and R257, and photo coupler ISO17 are the elements to provide for the E&M TRK circuit. The other elements are to provide for the loop, ground start and DID TRK circuits.

Describing the structure and operation of the multifunctional TRK circuit of the first embodiment with reference to FIGS. 2 and 4, the protective circuits 10 and 90 are respectively connected between the tip terminal TIP and ring terminal RING, and between the "M" terminal and the "E" terminal, including surge arresters for preventing over voltage and polyswitches for preventing over current. Namely, the protective circuit 10 consists of surge arresters DSSV1, DSSV9 and polyswitches PS1, PS9, and the protective circuit 90 of surge arresters DSSV17, DSSV25 and polyswitches PS17, PS25.

The relays RL9A and RL9B are the single-pole double-throw type, controlling polarity reverse in the DID TRK circuit. The relay RL9A has the single pole (1) connected with the tip terminal TIP, first throw (2) connected with the single pole (1) of the relay RL1A and the first throw (2) of the relay RL1B and one end of the ring path 40, and second throw (3) connected with the first throw (2) of the relay RL9B and the single pole (1) of the relay RL25B and the single pole (1) of the relay RL17B and the lower end of the primary coil of the transformer T.

The relay RL1B and the first switching & tip ground detection circuit 20 is for detecting the tip ground in the ground start TRK circuit. This circuit comprises resistors R25, R1, R9, R81, R73, R65, diodes D1, D9, photo coupler ISO1, capacitor C1, and transistors Q1, Q9. The transistors Q1 and Q9 are turned on in the ground start trunk mode, and off in the other modes. The relay RL1B is cut off when the relay RL1A occupies the loop. The photo coupler ISO1, resistors R1 and R9, and the capacitor C1 are for detecting the tip ground, and for generating the resultant signal TGD. The other constituent elements of resistors R25, R81, R73, R65, diodes D1, D9, and transistors Q1, Q9 serve as the first switching circuit.

The relay RL1B is the single-pole double-throw type, having the single pole (1) connected to the one end of the resistor R25. The first throw (2) is connected with the first throw (2) of the relay RL9A. The other end of the resistor R25 is connected with the cathode of the diode D1 and the anode of the light emitting diode (LED) of the photo coupler ISO1. The anode of the diode D1 is connected with the cathode of the LED of the photo coupler ISO1. The anode of the diode D1 is connected with the collector of the NPN transistor Q9 and the anode of the diode D9 with the cathode grounded. The base of the transistor Q9 is connected with one end of the resistor R81 with the other end connected to one end of the resistor R73, whose other end is connected with the collector of the NPN transistor Q1. The emitter of the transistor Q1 is connected with the source voltage Vcc, the base of which is connected with one end of the resistor R65 with the other end applied with DIS56V. The LED of the photo coupler ISO1 is an NPN transistor, the collector of which is connected with the source voltage Vcc, and the emitter is connected with one end of the resistors R1 and R9. The other end of the resistor R9 is grounded while the other end of the resistor R1 is connected so as to generate the tip ground detection signal TGD. In addition, the other end of the resistor R1 is connected with one end of the capacitor C1 with the other end grounded.

The relay RL25B and second switching and ring ground enable circuit 80 are to enable the ring ground in the ground start trunk mode. The second switching and the ring ground enable circuit comprises the relay RL25B, resistors R41, R49, R57, diodes D33, D41, and transistors Q49, Q57. The relay RL25B is made in the ground start trunk mode, and broken in the other modes. The transistors Q49, Q57 are turned on in the ground start trunk mode, and off in the other modes.

The relay RL25B is the single-pole double-throw type, having the single pole (1) connected with the first throw (2) of the relay RL9B and the first throw (2) connected with one end of the resistor R41. The other end of the resistor R41 is connected with the cathode of the diode D33 and the cathode of the diode D41 with the anode applied with the source voltage of −56V. The emitter of the NPN transistor Q57 is connected with the anode of the diode D33, the collector of which is grounded, and the base is connected with one end of the resistor R57. The emitter of the PNP transistor Q49 is connected with the source voltage Vcc, the collector of which is connected with the other end of the resistor R57, and the base with one end of the resistor R49 with the other end applied with the loop signal LOOP1.

The relay RL1A is also the single-pole double-throw type, serving as the loop circuit when occupying the loop in the loop trunk mode and ground start trunk mode, and always being made in the other modes. The single pole (1) of the relay RL1A is connected with the first throw (2) of the relay RL9A, and the first throw (2) through the capacitor C57 with one end of the primary coil of the transformer T.

The ring path 40 is connected in parallel with the relay RL1A, including a capacitor C9, resistor R33 and Zener diodes ZD1, ZD9 that are connected in series. The ring path 40 is to transfer the ring signal coming into the trunk circuit to the bridge diode BD, which ring signal is detected by the ring & HOS detection circuit 60 connected with the DC bypass circuit 50.

The relays RL17A and RL17B provide the loop trunk circuit and ground start trunk circuit with dial pulses, otherwise being made or broken according to the condition of each trunk mode. These are the single-pole double-throw type. The single pole (1) of the relay RL17A is connected with the ring path 40 and the first throw (2) of the relay RL1A, and the first throw (2) with the first terminal (1) of the bridge diode BD, and the second throw (3) with one end of the feeding circuit 70. The single pole (I) of the relay RL17B is connected with the first throw (2) of the relay RL9B and the single pole (1) of the relay RL25B, and the first throw (2) with the third terminal (3) of the bridge diode BD, and the second throw (3) with both ring & HOS detection circuit 60 and feeding circuit 70.

The DC bypass circuit 50 comprises diodes D17, D25, MOSFET (Metal Oxide Semiconductor Field Effect Transistor) Q97, resistors R97, R105 R113, capacitor C25, and Zener diodes ZD17, TVS9, serving as the DC termination in the loop trunk circuit and ground start trunk circuit. The diodes D17, D25, FET Q97 and resistor R113 are connected in series between the third and fourth terminals (3 and 4) of the bridge diode BD. Describing more specifically, the anode of the diode D17 is connected with the fourth terminal (4) of the bridge diode BD, the cathode of the diode D17 with the anode of the diode D25, and the cathode of the diode D25 with the drain of the FET Q97. The source of FET Q97 is connected with one end of the resistor R113 with the other end connected to the second terminal (2) of the bridge diode BD. Connected in series between the third and fourth terminals (3 and 4) of the bridge diode BD are the resistors R97 and R106, with which the Zener diode TVS9 is connected in parallel. The junction of the resistors R97 and R105 is connected with the gate of FET Q97, cathode of the Zener diode ZD17 and one end of the capacitor C25. The anode of the Zener diode ZD17 and the other end of the capacitor C25 are connected with the source of FET Q97.

The ring & HOS detection circuit 60 detects both ring and HOS in the loop trunk circuit and ground start trunk circuit, and HOS in the DID trunk circuit. The former is carried out through the photo coupler ISO9, resistors R121, R129, R161, capacitor C41, and OR gate U1A, and the latter through the resistors R177, R201, R169, R321, transistors 113, Q105, capacitor C410, and OR gate U1A.

The LED of the photo coupler ISO9 and the resistor R121 are connected in series are connected in parallel with the diodes D17, D25 connected in series. The collector of the photo receiving transistor of the photo coupler ISO9 is connected with the source voltage Vcc, and the emitter with one end of the resistor R129 with the other end grounded. In addition, the emitter is connected with one end of the resistor R161 with the other end connected to the first input of the OR gate U1A. Connected between the other end of the resistor R161 and ground is a capacitor C41.

The second input of the OR gate U1A is connected with the collector of the PNP transistor Q105, between which and ground are connected the resistor R321 and capacitor C410 in parallel. The base of the transistor Q105 is connected with the collector of the NPN transistor Q113. The resistor R169 is connected between the base of the transistor Q113 and ground. The resistor R201 is connected between the base and emitter of the transistor Q113. Also connected with the emitter is one end of the resistor R177 with the other end connected to the emitter of the transistor Q33, which is an element of the feeding circuit 70. The OR gate U1A logically adds the first and second input signal to generate the R&HD signal.

The feeding circuit 70 supplying −56V in the DID trunk circuit is designed to have an impedance so high as not to pass AC signals, comprising resistors R137, R145, R153, R209, R217, R193, R185, capacitors C33, C49, transistors Q17, Q25, Q41, Q33, and Zener diodes ZD41, ZD49. Among these, the transistors Q17 and Q25 and their peripheral circuit constitute a switching circuit to supply or cut off the source voltage of −56V according to the E568DTG1 signal. Namely, it supplies −56V in the DID trunk circuit, or otherwise not in the other trunk circuits. The transistor Q17 consists of a PNP transistor, of which the emitter is connected with the source voltage Vcc, and the base is supplied with E568DTG1 signal through the resistor R137. Between the emitter and collector of the transistor Q17 is connected the capacitor C33, and the collector connected with one end of the resistor R145, whose other end is connected with one end of the resistor R153 with the other end connected to the base of the NPN transistor Q25, the emitter of which is applied with −56V, and the collector is connected with one end of the resistor R209 and the anode of the Zener diode ZD41.

Except for the elements serving as the switching circuit, the other constituent elements of the feeding circuit 70 are to simply supply −56V. These are symmetrically arranged. Namely, the transistor Q41, resistors R209, R217, and Zener diode ZD41 are arranged symmetrically with the transistor Q33, resistors R185, R193, and Zener diode ZD49. The NPN transistor Q41 has the collector connected with the second throw (3) of the relay RL17A, and the emitter with one end of the resistor R209 with the other end connected with the collector of the transistor Q25. Connected between the collector and base of the transistor Q41 is the resistor R217, and the base with the cathode of the Zener diode ZD41, whose anode is connected with the collector of the transistor Q25. Likewise, the collector of the PNP transistor Q33 is connected with the second throw (3) of the relay RL17B, and the emitter grounded through the resistor R185. The resistor R177 is connected between the emitters of the transistors Q33 and Q113. The base of the transistor Q33 is connected with the anode of the Zener diode ZD49 with the cathode grounded. The bases of the symmetrical two transistors Q33 and Q41 are connected through the capacitor C49.

As to the E & M trunk circuit, the relay RL25A is to transmit the E and M signals. The relay RL25A is also the single-pole double-throw type, having the single pole (1) connected with the M terminal, the first throw (2) connected with one end of the resistor R241 with the other end applied with the source voltage of −56V, and the second throw (3) grounded. Connected between the single pole (1) and the first throw (2) of the relay RL25A are the resistor R225 and capacitor C97 in parallel. In addition, the resistors R233, R249, R265, R257, diode D49, photo coupler ISO17, and capacitor C105 constitute E&M HOS signal detection circuit. One end of the resistor R233 is connected with the E terminal with the other end connected to the anode of the LED of the photo coupler ISO17, whose cathode is applied with −56V. The LED is connected in parallel with the resistor P249, and in series with the diode D49. More specifically describing, the cathode of the diode D49 is connected to the anode of the LED, whose cathode is connected with the anode of the diode D49. The collector of the photo receiving transistor of the photo coupler ISO17 is connected with the source voltage Vcc, and the emitter grounded through the resistor R257. In addition, the emitter is connected with one end of the resistor R265 with the other end connected with the E&MD signal output representing the result of detecting the E&M HOS signal. The other end of the resistor R265 is grounded through the capacitor C105.

The upper end of the primary coil of the transformer T is connected through the capacitor C57 with the first throw (2) of the relay RL1A, and the lower end with the first throw (2) of the relay RL9B. The upper end of the secondary coil of the transformer T is connected through the CODEC and hybrid circuits with the switching circuit (not shown) of the switching system. The lower end of the secondary coil is grounded. Namely, the upper end of the secondary coil is connected with the anode of the Zener diode ZD33, whose cathode is connected with the cathode of the Zener diode ZD25.

Figure 12A:
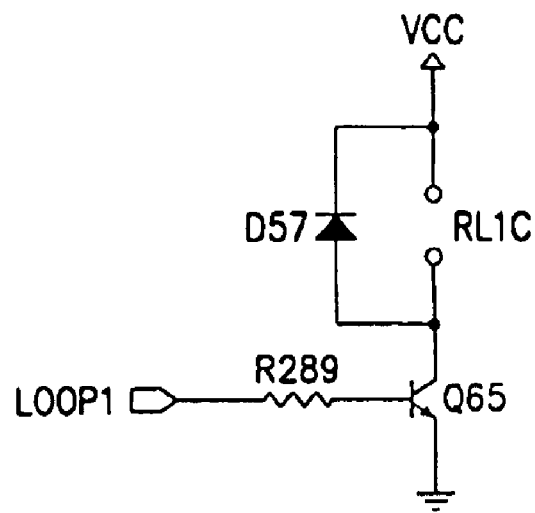
Figure 12B:
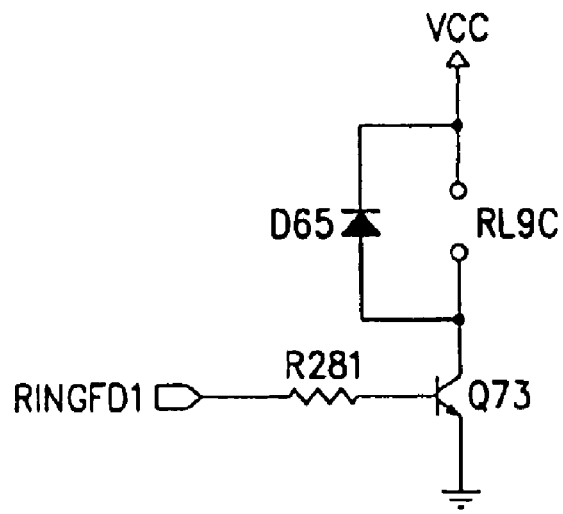
Figure 12C:
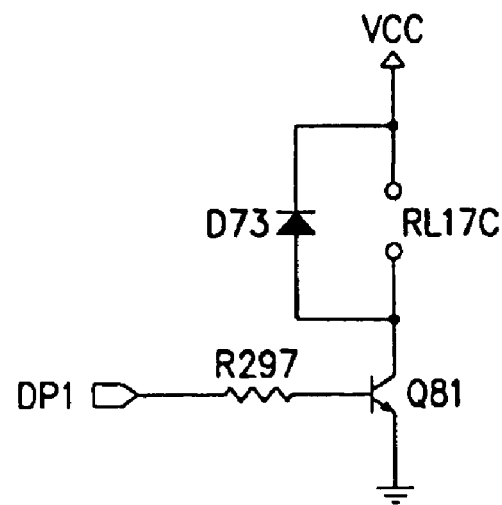
Figure 12D:
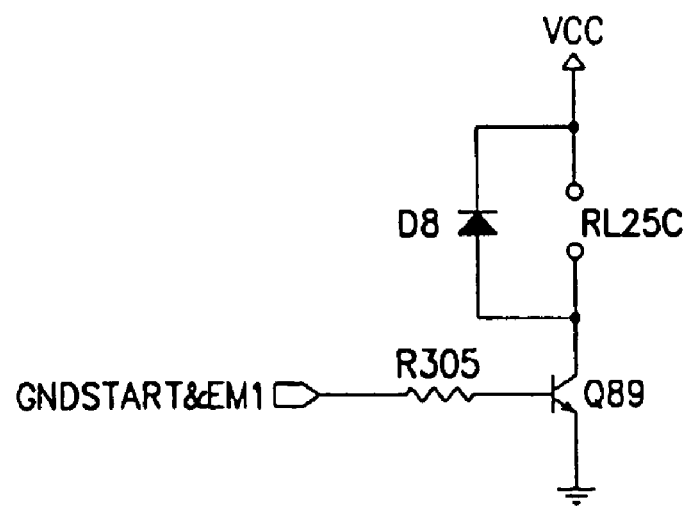

As described above, the trunk circuit according to the first embodiment of the present invention as shown in FIGS. 2 and 4 serves as the loop trunk, ground start trunk, DID) trunk, and E&M trunk. This is achieved by selectively driving the relays RL9(9A, 9B), RL1(1A, 1B), RL17(17A, 17B) and RL25(25A, 25B) and selectively turning on/off the transistors Q17 and Q1. In this case, the relays RL9A, RL9B are controlled by the relay drive circuit according to RINGFD1 signal as shown in FIG. 12B, the relays RL1A, RL1B according to LOOP1 signal as shown in FIG. 12A, the relays RL17A, RL17B according to DP1 signal as shown in FIG. 12C, and the relays RL25A, RL25B according to GNDSTART&EM1 signal as shown in FIG. 12D. The transistor Q17 is turned on or off by E568DTG1 signal, and the transistor Q1 by DIS56V signal.

FIG. 6 illustrates that the trunk circuit according to the first embodiment serves as the loop trunk. For this, the following Table 1 summarizes how to selectively drive the relays RL9(9A, 9B), RL1(1A, 1B), RL17(17A, 17B) and RL25(25A, 25B), and turn on or off the transistors Q17 and Q1.

TABLE 1

| PART | RL9 | RL1 | RL17 | RL25 | Q17 | Q1 |
|---|---|---|---|---|---|---|
| Op. | BREAK | LOOP CONTR | DIAL PULSE CONTROL | BREAK | OFF | OFF |

For the loop trunk, RL9 is broken, RL1 under loop relay control, RL17 under dial pulse control, and RL25 broken. Q17 is turned off by E568DTG1 signal of high level, and Q1 off by DIS56V signal of high level. Thus, the multifunctional trunk circuit as shown in FIG. 2 serves as the loop trunk as shown in FIG. 6.

FIG. 7 illustrates that the trunk circuit according to the first embodiment serves as the ground start trunk. For this, the following Table 2 summarizes how to selectively drive the relays RL9(9A, 9B), RL1(1A, 1B), RL17(17A, 17B) and RL25(25A, 25B), and turn on or off the transistors Q17 and Q1.

TABLE 2

| PART | RL9 | RL1 | RL17 | RL25 | Q17 | Q1 |
|---|---|---|---|---|---|---|
| Op. | BREAK | LOOP CONTROL | DIAL PULSE CONTROL | GROUND START CONTROL | OFF | ON |

For the ground start trunk, RL9 is broken, RL1 under loop relay control, RL17 under dial pulse control, and RL25 under ground start control. Q17 is turned off by E568DTG1 signal of high level, and Q1 on by DIS56V signal of low level. Thus, the multifunctional trunk circuit as shown in FIG. 2 serves as the ground start trunk as shown in FIG. 7.

FIG. 8 illustrates that the trunk circuit according to the first embodiment serves as the DID trunk. For this, the following Table 3 summarizes how to selectively drive the relays RL9(9A, 9B), RL1(1A, 1B), RL17(17A, 17B) and RL25(25A, 25B), and turn on or off the transistors Q17 and Q1.

TABLE 3

| PART | RL9 | RL1 | RL17 | RL25 | Q17 | Q1 |
|---|---|---|---|---|---|---|
| Op. | PRS RELAY CONTROL | MAKE | MAKE | BREAK | ON | OFF |

For the DID trunk, RL9 is under polarity reverse relay control, RL1 made, RL17 made, and RL25 broken. Q17 is turned on by E568DTG1 signal of low level, and Q1 off by DIS56V signal of high level. Thus, the multifunctional trunk circuit as shown in FIG. 2 serves as the DID trunk as shown in FIG. 8.

FIG. 11 illustrates that the trunk circuit according to the first embodiment serves as the E&M trunk. For this, the following Table 4 summarizes how to selectively drive the relays RL9(9A, 9B), RL1(LA, 1B), RL17(17A, 17B) and RL25(25A, 25B), and turn on or off the transistors Q17 and Q1.

TABLE 4

| PART | RL9 | RL1 | RL17 | RL25 | Q17 | Q1 |
|---|---|---|---|---|---|---|
| Op. | BREAK | MAKE | MAKE | E&M RELAY CONTROL | OFF | OFF |

For the E&M trunk, RL9 is broken, RL1 made, RL17 made, and RL25 under E&M relay control. Q17 is turned off by E568DTG1 signal of high level, and Q1 off by DIS56V signal of high level. Thus, the multifunctional trunk circuit as shown in FIG. 2 serves as the E&M trunk as shown in FIG. 11.

EXAMPLE 2

The circuit according to the second embodiment is, as shown in FIG. 3, designed to serve as both loop, ring down, both way and E&M TRK circuit. This may be effectively applied in a country like Korea. Referring to FIG. 3, the TRK circuit of the second embodiment comprises protective circuits 10 and 90, ring path 40, bridge diode BD, DC voltage bypass circuit 50, ring & HOS detection circuit 60, feeding circuit 70, transformer T, photo coupler ISO17, resistors R233 and R257, and a plurality of relays RL1A, RL1B, RL9A, RL9B, RL17A, RL17B, RL25A, RL25B. Among these, the protective circuit 90, relay RL25A, resistors R233 and R257, and photo coupler ISO17 are the elements to provide for the E&M TRK circuit. The other elements are to provide for the loop, ring down and both way TRK circuits.

Describing the structure and operation of the multifunctional TRK circuit of the second embodiment with reference to FIGS. 3 and 5, the protective circuits 10 and 90 are respectively connected between the tip terminal TIP and ring terminal RING, and between the "M" terminal and the "E" terminal, including surge arrestors for preventing over voltage and polyswitches for preventing over current. Namely, the protective circuit 10 consists of surge arrestors DSSV1, DSSV9 and polyswitches PS1, PS9, and the protective circuit 90 of surge arrestors DSSV17, DSSV25 and polyswitches PS17, PS25.

The relays RL9A and RL9B are the single-pole double-throw type, controlling the ring signal in the ring down TRK circuit. The relay RL9A has the single pole (1) connected with the tip terminal TIP, first throw (2) connected with the single pole (1) of the relay RL1A and the first throw (2) of the relay RL1B and one end of the ring path 40, and second throw (3) connected with the first throw (2) of the relay RL9B and the single pole (1) of the relay RL25B and the single pole (1) of the relay RL17B and the lower end of the primary coil of the transformer T.

The relay RL1A is the single-pole double-throw type, serving as the loop circuit when occupying the loop in the loop trunk mode. It is always made in the other trunk modes. The single pole (1) of the relay RL1A is connected with the first throw (2) of the relay RL9A, and the first throw (2) connected through the capacitor C57 with one end of the primary coil of the transformer T. The relay RL1B is broken when the relay RL1A occupies the loop. The relay RL1B is also the single-pole double throw type, the first throw (2) of which is connected with the first throw (2) of the relay RL9A, the single pole (1) of the relay RL1A and one end of the ring path 40.

The relay RL25B is operated only in the ground start trunk mode, but broken in the other modes. The relay RL25B is also the single-pole double-throw type, having the single pole (1) connected with the first throw (2) of the relay RL9B.

The ring path 40 is connected in parallel with the relay RL1A, including a capacitor C9, resistor R33 and Zener diodes ZD1, ZD9 that are connected in series. The ring path 40 is to transfer the ring signal coming into the trunk circuit to the bridge diode BD, which ring signal is detected by the ring & HOS detection circuit 60 connected with the DC bypass circuit 50.

The relays RL17A and RL17B are to provide the loop trunk circuit and ground start trunk circuit with dial pulses, and otherwise being made or broken according to the condition of each trunk mode. These are the single-pole double-throw type. The single pole (1) of the relay RL17A is connected with the ring path 40 and the first throw (2) of the relay RL1A, and the first throw (2) with the first terminal (1) of the bridge diode BD, and the second throw (3) with one end of the feeding circuit 70. The single pole (1) of the relay RL17B is connected with the first throw (2) of the relay RL9B and the single pole (1) of the relay RL25B, and the first throw (2) with the third terminal (3) of the bridge diode BD, and the second throw (3) with both ring & HOS detection circuit 60 and feeding circuit 70.

The DC bypass circuit 50 comprises diodes D17, D25, MOSFET Q97, resistors R97, R105 R113, capacitor C25, and Zener diodes ZD17, TVS9, serving as the DC termination in the loop and both way TRK circuits. The diodes D17, D25, FET Q97 and resistor R113 are connected in series between the third and fourth terminals (3 and 4) of the bridge diode BD. More specifically describing, the anode of the diode D17 is connected with the fourth terminal (4) of the bridge diode BD, the cathode of the diode D17 with the anode of the diode D25, and the cathode of the diode D25 with the drain of the FET Q97. The source of FET Q97 is connected with one end of the resistor R113 with the other end connected to the second terminal (2) of the bridge diode BD. Connected in series between the third and fourth terminal (3 and 4) of the bridge diode BD are the resistors R97 and R106, with which the Zener diode TVS9 is connected in parallel. The junction of the resistors R97 and R105 is connected with the gate of FET Q97, cathode of the Zener diode ZD17 and one end of the capacitor C25. The anode of the Zener diode ZD17 and the other end of the capacitor C25 are connected with the source of FET Q97.

The ring & HOS detection circuit 60 is to detect both ring and HOS in the loop trunk circuit and ground start trunk circuit, and HOS in the DID trunk circuit. The former is carried out through the photo coupler ISO9, resistors R121, R129, R161, capacitor C41, and OR gate U1A, and the latter through the resistors R177, R201, R169, R321, transistors Q113, Q105, capacitor C410, and OR gate U1A.

The LED of the photo coupler ISO9 and the resistor R121 connected in series are connected in parallel with the diodes D17, D25 connected in series. The collector of the photo receiving transistor of the photo coupler ISO9 is connected with the source voltage Vcc, and the emitter with one end of the resistor R129 with the other end grounded. In addition, the emitter is connected with one end of the resistor R161 with the other end connected to the first input of the OR gate U1A. Connected between the other end of the resistor R161 and ground is a capacitor C41.

The second input of the OR gate U1A is connected with the collector of the PNP transistor Q105, between which and ground are connected the resistor R321 and capacitor C410 in parallel. The base of the transistor Q105 is connected with the collector of the NPN transistor Q113. The resistor R169 is connected between the base of the transistor Q113 and ground. The resistor R201 is connected between the base and emitter of the transistor Q113. Also connected with the emitter is one end of the resistor R177 with the other end connected to the emitter of the transistor Q33, which is an element of the feeding circuit 70. The OR gate U1A logically adds the first and second input signal to generate the R&HD signal.

The feeding circuit 70 supplying -56V in the both way TRK circuit is designed to have an impedance so high as not to pass AC signals, comprising resistors R137, R145, R153, R209, R217, R193, R185, capacitors C33, C49, transistors Q17, Q25, Q41, Q33, and Zener diodes ZD41, ZD49. Among these, the transistors Q17 and Q25 and their peripheral circuit constitute a switching circuit to supply or cut off the source voltage of -56V according to E568DTG1 signal. Namely, it supplies -56V in the both way TRK circuit, or otherwise not in the other TRK circuits. The transistor Q17 consists of a PNP transistor, of which the emitter is connected with the source voltage Vcc, and the base is supplied with E568DTG1 signal through the resistor R137. Between the emitter and collector of the transistor Q17 is connected the capacitor C33, and the collector connected with one end of the resistor R145, whose other end is connected with one end of the resistor R153 with the other end connected to the base of the NPN transistor Q25, the emitter of which is applied with -56V, and the collector is connected with one end of the resistor R209 and the anode of the Zener diode ZD41.

Except for the elements serving as the switching circuit, the other constituent elements of the feeding circuit 70 are to simply supply -56V. These are symmetrically arranged. Namely, the transistor Q41, resistors R209, R217, and Zener diode ZD41 are arranged symmetrically with the transistor Q33, resistors R185, R193, and Zener diode ZD49. The NPN transistor Q41 has the collector connected with the second throw (3) of the relay RL17A, and the emitter with one end of the resistor R209 with the other end connected with the collector of the transistor Q25. Connected between the collector and base of the transistor Q41 is the resistor R217, and the base with the cathode of the Zener diode ZD41, whose anode is connected with the collector of the transistor Q25. Likewise, the collector of the PNP transistor Q33 is connected with the second throw (3) of the relay RL17B, and the emitter grounded through the resistor R185. The resistor R177 is connected between the emitters of the transistors Q33 and Q 113. The base of the transistor Q33 is connected with the anode of the Zener diode ZD49 with the cathode grounded. The bases of the symmetrical two transistors Q33 and Q41 are connected through the capacitor C49.

As to the E & M trunk circuit, the relay RL25A is to transmit the E and M signals. The relay RL25A is also the single-pole double-throw type, having the single pole (1) connected with the M terminal, the first throw (2) connected with one end of the resistor R241 with the other end applied with the source voltage of -56V, and the second throw (3) grounded. Connected between the single pole (1) and the first throw (2) of the relay RL25A are the resistor R225 and capacitor C97 in parallel. In addition, the resistors R233, R249, R265, R257, diode D49, photo coupler ISO17, and capacitor C105 constitute E&M HOS signal detection circuit. One end of the resistor R233 is connected with the E terminal with the other end connected to the anode of the LED of the photo coupler ISO 17, whose cathode is applied with -56V. The LED is connected in parallel with the resistor R249, and in series with the diode D49. More specifically, the cathode of the diode D49 is connected to the anode of the LED, whose cathode is connected with the anode of the diode D49. The collector of the photo receiving transistor of the photo coupler ISO17 is connected with the source voltage Vcc, and the emitter grounded through the resistor R257. In addition, the emitter is connected with one end of the resistor R265 with the other end connected with the E&MD signal output representing the result of detecting the E&M HOS signal. The other end of the resistor R265 is grounded through the capacitor C105.

The upper end of the primary coil of the transformer T is connected through the capacitor C57 with the first throw (2) of the relay RL1A, and the lower end with the first throw (2) of the relay RL9B. The upper end of the secondary coil of the transformer T is connected through the CODEC and hybrid circuits with the switching circuit (not shown) of the switching system. The lower end of the secondary coil is grounded. Namely, the upper end of the secondary coil is connected with the anode of the Zener diode ZD33, whose cathode is connected with the cathode of the Zener diode ZD25.

As described above and shown in FIGS. 3 and 5, the trunk circuit according to the second embodiment of the present invention serves as the loop trunk, both way trunk, ring down trunk, and E&M trunk. This is achieved by selectively driving the relays RL9(9A, 9B), RL1(1A, 1B), RL17(17A, 17B) and RL25(25A, 25B) and selectively turning on/off the transistor Q17. In this case, the relays RL9A, RL9B are controlled by the relay drive circuit according to RINGFD1 signal as shown in FIG. 12B, the relays RL1A, RL1B according to LOOP1 signal as shown in FIG. 12A, the relays RL17A, RL17B according to DP1 signal as shown in FIG. 12C, and the relays RL25A, RL25B according to GNDSTART&EM1 signal as shown in FIG. 12D. The transistor Q17 is turned on or off by E568DTG1 signal.

FIG. 6 illustrates that the trunk circuit according to the second embodiment serves as the loop trunk. For this, the following Table 5 summarizes how to selectively drive the relays RL9(9A, 9B), RL1(1A, 1B), RL17(17A, 17B) and RL25(25A, 25B), and turn on or off the transistors Q17.

TABLE 5

| PART | RL9 | RL1 | RL17 | RL25 | Q17 |
|---|---|---|---|---|---|
| Op. | BREAK | LOOP CONTROL | DIAL PULSE CONTROL | BREAK | OFF |

For the loop trunk, RL9 is broken, RL1 under loop relay control, RL17 under dial pulse control, and RL25 broken. Q17 is turned off by E568DTG1 signal of high level. Thus, the multifunctional trunk circuit as shown in FIG. 3 serves as the loop trunk as shown in FIG. 6.

FIG. 9 illustrates that the trunk circuit according to the second embodiment serves as the both way trunk. For this, the following Table 6 summarizes how to selectively drive the relays RL9(9A, 9B), RL1(1A, 1B), RL17(17A, 17B) and RL25(25A, 25B), and turn on or off the transistors Q17.

TABLE 6

| PART | RL9 | RL1 | RL17 | RL25 | Q17 |
|---|---|---|---|---|---|
| Op. | BREAK | MAKE | OUTGOING RELAY CONTROL | BREAK | ON |

For the loop trunk, RL9 is broken, RL1 made, RL17 under outgoing relay control, and RL25 broken. Q17 is turned on by E568DTG1 signal of low level. Thus, the multifunctional trunk circuit as shown in FIG. 3 serves as the both way trunk as shown in FIG. 9.

FIG. 10 illustrates that the trunk circuit according to the second embodiment serves as the ring down trunk. For this, the following Table 7 summarizes how to selectively drive the relays RL9(9A, 9B), RL1(1A, 1B), RL17(17A, 17B) and RL25(25A, 25B), and turn on or off the transistors Q17.

TABLE 7

| PART | RL9 | RL1 | RL17 | RL25 | Q17 |
|---|---|---|---|---|---|
| Op. | RING CONTROL | LOOP CONTROL | DIAL PULSE CONTROL | BREAK | OFF |

For the ring down trunk, RL9 is under ring relay control, RL1 under loop relay control, RL17 under dial pulse control, and RL25 broken. Q17 is turned off by E568DTG1 signal of high level. Thus, the multifunctional trunk circuit as shown in FIG. 3 serves as the ring down trunk as shown in FIG. 10.

FIG. 11 illustrates that the trunk circuit according to the second embodiment serves as the E&M trunk. For this, the following Table 8 summarizes how to selectively drive the relays RL9(9A, 9B), RL1(1A, 1B), RL17(17A, 17B) and RL25(25A, 25B), and turn on or off the transistors Q17.

TABLE 8

| PART | RL9 | RL1 | RL17 | RL25 | Q17 |
|---|---|---|---|---|---|
| Op. | BREAK | MAKE | MAKE | E&M RELAY CONTROL | OFF |

For the E&M trunk, RL9 is broken, RL1 made, RL17 made, and RL25 under E&M relay control. Q17 is turned off by E568DTG1 signal of high level. Thus, the multifunctional trunk circuit as shown in FIG. 3 serves as the E&M trunk as shown in FIG. 11.

As shown in FIG. 13, the multifunctional analog trunk circuit makes changes of its operational state. Detecting the hooking off of the subscriber at the idle state S10, the TRK circuit is shifted to the signal transmission state S20. When the dialing is completed at the signal transmission state S20, it is shifted to the communication state S30. Then detecting the hooking on of the subscriber at the state S30, it is returned to the idle state S10. Also detecting the ring signal at the idle state S10, it is shifted to the signal receiving state S40.

Detecting the hooking off at the receiving state S40, it is shifted to the communication state S30.

FIG. 14 illustrates the process of shifting the multifunctional analog circuit of the present invention from the idle state to the signal transmitting state and to the signal receiving state, FIG. 15 the process of shifting the multifunctional analog circuit of the present invention from the signal transmission state to the communication state and to the idle state, and FIG. 16 the process of shifting the multifunctional analog circuit of the present invention from the signal receiving state to the communication state and to the idle state. In this case, the DID TRK has no transmission function, and therefore does not perform the step of shifting from the idle state to the transmission state.

Hereinafter is described the operation of the multifunctional TRK circuit with reference to FIGS. 14 to 16. When attempting to occupy the central office line (attempting the transmission), it is determined whether the TRK circuit is set to the loop trunk mode in step 202. If it is the loop trunk mode, it is shifted to the transmission mode of step 203, as shown in FIG. 14. Then, referring to FIG. 15, it drives the loop relay RL1 in step 250 to perform the dialing. Completing the dialing, it performs the communication in step 251, and then shifts to the idle state of step 253 upon detecting the hooking on in step 252.

If the multifunctional TRK circuit attempts to occupy the office line in the ground start TRK mode in step 204 as shown in FIG. 14, it drives the ground relay RL25 in step 205 to generate the ground signal, then shifting to the transmission state of step 206. Then, referring to FIG. 15, if it detects the ground acknowledge signal GROUND ACK in step 243, it performs the steps of 250 to 253 as in the loop TRK mode.

If the multifunctional TRK circuit attempts to occupy the office line in the E&M or both way TRK mode in step 207 as shown in FIG. 14, it drives the E&M relay RL25 in step 208 to generate the M signal, then shifting to the transmission state of step 212. Then, referring to FIG. 15, if it detects the E signal in step 246, it performs the steps of 250 to 253 as in the loop TRK mode.

If the multifunctional TRK circuit attempts to occupy the office line in the ring down TRK mode in step 209 as shown in FIG. 14, it drives the ring relay RL9 in step 211, then shifting to the transmission state of step 212. Then, referring to FIG. 15, it performs the steps of 250 to 253 as in the loop TRK mode.

Describing the operation of the multifunctional TRK circuit in the receiving state, the TRK circuit determines in step 213 whether it is set to the ring down or loop TRK mode. If it is in the ring down or loop TRK mode, it detects the ring signal in step 214 to shift to the receiving state of step 216, as shown in FIG. 14. Then, referring to FIG. 16, if the phone is hooked off in response to the ring signal in step 261, the TRK circuit makes the communication in step 262, then returning to the idle state 264 after completing the communication.

Likewise, in the ground start TRK mode of step 217, if detecting the ground signal in step 218, the multifunctional TRK circuit drives the ground relay RL25 to shift to the receiving state in step 221. Then, referring to FIG. 16, if the phone is hooked off in response to the ring signal in step 261, the TRK circuit makes the communication in step 262, then returning to the idle state 264 after completing the communication.

Likewise, in the DID TRK mode of step 222, if detecting the hooking off signal in step 223, the multifunctional TRK circuit generates the PRS signal to drive the PRS relay RL9 in step 225, and subsequently detects the DTMF (Dual Tone Multi Frequency) or pulse dial in step 226. According to the DTMF or pulse dial, it searches DID table to identify the extension phone number to receive the ring signal, then shifting to the receiving state in step 231. Then, referring to FIG. 16, if the phone is hooked off in response to the ring signal in step 261, the TRK circuit makes the communication in step 262, then returning to the idle state 264 after completing the communication.

Likewise, in the E&M or both way TRK mode of step 227, if detecting the E signal in step 229, the multifunctional TRK circuit drives the E&M relay RL25 to transfer the M signal in step 230, then shifting to the receiving state in step 231. Then, referring to FIG. 16, if the phone is hooked off in response to the ring signal in step 261, the TRK circuit makes the communication in step 262, then returning to the idle state 264 after completing the communication.

Thus, the invention may provide a single TRK board that selectively serves as loop TRK, ground start TRK, DID TRK, ring down TRK, both-way TRK or E&M TRK circuit, thereby considerably decreasing the cost of producing and maintaining the TRK circuits.

While the present invention has been described with specific embodiments accompanied by the attached drawings, it will be appreciated by those skilled in the art that various changes and modifications may be made thereto without departing the gist of the present invention.

What is claimed is:

1. A multifunctional analog trunk (TRK) circuit provided in a switching system connected with a central office line, said TRK circuit being connectable between (1) a tip terminal, "M" terminal and "E" terminal of said switching system and (2) a hybrid circuit and codec of a switching circuit, said TRK circuit comprising:

a first relay connectable with said tip terminal of said switching system;

a second relay for connectable with a ring terminal of said switching system;

said first relay and said second relay provide control of a polarity reverse in DID (Direct Inward Dialing tie line) trunk mode;

a transformer comprising a primary coil and a secondary coil, an upper end of said secondary coil connectable with the codec and hybrid circuits of said switching circuit and a lower end of said secondary coil is grounded;

a third relay connected between an output of said first relay and an upper end of the primary coil of said transformer for occupying a loop in one of a loop and a ground start TRK mode;

a ring path connected in parallel with both ends of said third relay for transfering a ring signal coming from said central office line;

a fourth relay driven in said ground start TRK mode, said fourth relay being cut off when said third relay occupies said loop;

a tip ground detection circuit connected with an output of said fourth relay for detecting a grounding of said tip terminal in said ground start TRK mode;

a fifth relay connected with an output of said second relay to be driven in said ground start TRK mode;

a ring ground enable circuit connected with an output of said fifth relay for grounding said ring terminal in said ground start TRK mode;

a bridge diode connected in parallel with the primary coil of said transformer for full-wave rectification of a signal transferred through said ring path;

a sixth relay connected between said ring path and said bridge diode;

a seventh relay connected between said bridge diode and the output of said second relay;

said sixth relay and said seventh relay for providing dial pulses in said loop or ground start TRK mode;

a bypass circuit connected with an output of said bridge diode to bypass a direct current voltage output of said bridge diode in said loop or ground start TRK mode;

a ring and HOS detection circuit connected with said bypass circuit for detecting the ring and HOS signal in said loop or ground start TRK mode, and said HOS signal in said DID TRK mode;

a feeding circuit connected with said "M" terminal to supply a prescribed source voltage to said sixth and seventh relays;

an eighth relay connected with said "M" terminal for grounding said "M" terminal when idle and for supplying said source voltage to said "M" terminal in E&M TRK mode; and, an HOS signal detection circuit connected with said "E" terminal to detect said HOS signal in said E&M TRK mode.

2. A multifunctional analog TRK circuit according to claim 1, wherein
said first relay and second relay are paired;
said third relay and said fourth relay are paired;
said fifth relay and said eighth relay are paired; and,
said sixth relay and said seventh relay are paired; wherein each pair of relays is simultaneously operated.

3. A multifunctional analog TRK circuit according to claim 2, wherein each relay in each of said pair of relays is a single-pole double-throw type.

4. A multifunctional analog TRK circuit according to claim 1, wherein said TRK circuit resides in a single board.

5. A multifunctional analog TRK circuit according to claim 1, further comprising:

a first zener diode and a second zener diode being connected in series, and said first and second zener diodes being connected in parallel with said secondary coil of said tranformer, so that an anode of a said first zenor diode is connected to an upper end of said secondary coil and a cathode of said first zener diode is connected with a cathode of said second zener diode.

6. A multifunctional analog TRK circuit provided in a switching system connected with a central office line, said TRK circuit being connectable between (1) a tip terminal, "M" terminal and "E" terminal of said switching system and (2) a hybrid circuit and codec of a switching circuit, said TRK circuit comprising:

a first relay connectable with said tip terminal of said switching system;

a second relay connectable with said ring terminal;

said first relay and said second relay provide control of a ring signal in ring down TRK mode;

a transformer comprising a primary coil and a secondary coil, said secondary coil connectable with the codec and hybrid circuits of said switching circuit;

a third relay connected between an output of said first relay and an upper end of the primary coil of said transformer for occupying a loop in one of a loop and a ring down TRK mode;

a ring path connected in parallel with both ends of said third relay to transfer a ring signal coming from said central office line;

a bridge diode connected in parallel with the primary coil of said transformer for full-wave rectification of a signal transferred through said ring path;

a fourth relay connected between said ring path and said bridge diode;

a fifth relay connected between said bridge diode and an output of said second relay;

said fourth relay and said fifth relay provide dial pulses in said loop, ring down or both way TRK mode;

a bypass circuit connected with an output of said bridge diode for bypassing a direct current voltage output of said bridge diode in said loop or both way TRK mode;

a ring & HOS detection circuit connected with said bypass circuit to detect the ring and HOS signal in said loop or ring down TRK mode, and said HOS signal in said both way TRK mode;

a feeding circuit for supplying a prescribed source voltage to said fourth and fifth relays in said both way TRK mode;

a sixth relay connected with said "M" terminal for supplying said source voltage to said "M" terminal when idle, and for grounding said "M" terminal in E&M TRK mode; and, an HOS signal detection circuit connected with said "E" terminal for detecting said HOS signal in said E&M TRK mode.

7. A multifunctional analog TRK circuit according to claim 5, wherein said first relay and said second relay are paired;

said fourth and fifth relays paired; and, each pair of relays is simultaneously operated.

8. A multifunctional analog trunk (TRK) circuit provided in a switching system connected with a central office line, said TRK circuit being connected between (1) a tip terminal, "M" terminal and "E" terminal of said switching system, and (2) a primary coil of a transformer which is part of a switching circuit, said TRK circuit comprising:

a first relay for connection with said tip terminal of said switching system;

a second relay for connection with a ring terminal of said switching sysyem;

said first relay and said second relay for controlling a polarity reverse in DID (Direct Inward Dialing tie line) trunk mode;

a third relay connected with an output of said first relay, and said third relay is connectable with the primary coil of said transformer of said switching circuit for occupying a loop in one of a loop and a ground start TRK mode;

a ring path connected in parallel with both ends of said third relay for transferring a ring signal coming from said central office line;

a fourth relay being driven in said ground start TRK mode, and said fourth relay being cut off when said third relay occupies said loop;

a tip ground detection circuit connected with an output of said fourth relay for detecting a grounding of said tip terminal in said ground start TRK mode;

a fifth relay connected with an output of said second relay, said fifth relay being driven in said ground start TRK mode;

a ring ground enable circuit connected with an output of said fifth relay for grounding said ring terminal in said ground start TRK mode;

a bridge diode connected in parallel with said transformer for full-wave rectification of a signal transferred through said ring path;

a sixth relay connected between said ring path and bridge diode;

a seventh relay connected between said bridge diode and an output of said second relay;

said sixth relay and said seventh relay provide dial pulses in said loop or ground start TRK mode;

a bypass circuit connected with said "M" terminal for grounding said "M" terminal when idle and for supplying said source voltage to said "M" terminal in E&M TRK mode; and, an HOS signal detection circuit connected with said "E" terminal to detect said HOS signal in said E&M TRK mode.

* * * * *

UNITED STATES PATENT AND TRADEMARK OFFICE
CERTIFICATE OF CORRECTION

PATENT NO. : 6,891,947 B1
DATED : May 10, 2005
INVENTOR(S) : Kyung-Hwan Kim and Dong-Sik Han It is certified that error appears in the above-identified patent and that said Letters Patent is hereby corrected as shown below:

Title page,
Item [30], Foreign Application Priority Data, number should be corrected to:
-- 98-57859 --.

Signed and Sealed this

Thirtieth Day of August, 2005

JON W. DUDAS
*Director of the United States Patent and Trademark Office*